(12) United States Patent
Inoue

(10) Patent No.: US 9,230,125 B2
(45) Date of Patent: Jan. 5, 2016

(54) IMAGE FORMING APPARATUS, PRINTING METHOD, AND STORAGE MEDIUM

(75) Inventor: Go Inoue, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 270 days.

(21) Appl. No.: 13/594,626

(22) Filed: Aug. 24, 2012

(65) Prior Publication Data

US 2013/0061041 A1 Mar. 7, 2013

(30) Foreign Application Priority Data

Sep. 1, 2011 (JP) ................................ 2011-190687

(51) Int. Cl.
*G06F 21/60* (2013.01)
*H04L 29/06* (2006.01)
*G06F 21/44* (2013.01)

(52) U.S. Cl.
CPC .............. *G06F 21/608* (2013.01); *G06F 21/44* (2013.01); *H04L 63/0823* (2013.01); *G06F 2221/2115* (2013.01); *G06F 2221/2129* (2013.01); *H04L 63/166* (2013.01); *H04L 63/20* (2013.01)

(58) Field of Classification Search
CPC .................................................. G06F 21/608
USPC ............................ 726/1–4, 10; 713/155–156
See application file for complete search history.

(56) References Cited

U.S. PATENT DOCUMENTS

| 7,248,693 | B1* | 7/2007 | Tretter | H04L 9/3234 380/278 |
| 7,463,374 | B2* | 12/2008 | Corlett | G06F 21/608 358/1.14 |
| 7,982,890 | B2* | 7/2011 | Corlett | G06F 21/608 358/1.14 |
| 8,245,306 | B2* | 8/2012 | Gimenez | 726/27 |
| 8,341,717 | B1* | 12/2012 | Delker et al. | 726/10 |
| 8,537,395 | B2* | 9/2013 | Shozaki | 358/1.15 |
| 8,826,004 | B2* | 9/2014 | Euchner | G06F 21/608 713/155 |
| 2002/0042884 | A1* | 4/2002 | Wu | G06F 21/645 726/10 |
| 2003/0050894 | A1* | 3/2003 | Kambayashi et al. | 705/57 |
| 2003/0079134 | A1* | 4/2003 | Manchala | G06Q 20/3821 713/182 |
| 2005/0275866 | A1* | 12/2005 | Corlett | G06F 21/608 358/1.14 |
| 2006/0064580 | A1* | 3/2006 | Euchner | G06F 21/608 713/156 |
| 2006/0107039 | A1* | 5/2006 | Sugiura et al. | 713/156 |
| 2007/0234055 | A1* | 10/2007 | Ohara | G06F 21/33 713/170 |
| 2008/0043274 | A1* | 2/2008 | Wang | G06F 21/608 358/1.14 |
| 2009/0040557 | A1* | 2/2009 | Corlett | G06F 21/608 358/1.15 |

(Continued)

FOREIGN PATENT DOCUMENTS

JP 2007-334753 A 12/2007

OTHER PUBLICATIONS

Wong et al.; A Web-based secure system for the distributed printing of documents and images; Published in: Image Processing, 1998. ICIP 98. Proceedings. 1998 International Conference on; Date of Conference: Oct. 4-7, 1998; pp. 2-6 vol. 3; IEEE Xplore.*

(Continued)

*Primary Examiner* — Bradley Holder
(74) *Attorney, Agent, or Firm* — Canon USA, Inc. IP Division

(57) ABSTRACT

An image forming apparatus, for use in a printing system including a print client, a printer server, and an authentication server, enables a secure print setting according to received policy information specifying that printing is to be performed using a secure print protocol employing a certificate.

9 Claims, 24 Drawing Sheets

(56) References Cited

U.S. PATENT DOCUMENTS

| | | | |
|---|---|---|---|
| 2009/0244594 A1* | 10/2009 | Nuggehalli | G06F 21/608 358/1.15 |
| 2010/0182630 A1* | 7/2010 | Jethani | G06F 21/608 358/1.15 |
| 2011/0030029 A1* | 2/2011 | Woo | 726/1 |

OTHER PUBLICATIONS

Czerwinski et al; An architecture for a secure service discovery service; Published in: Proceeding MobiCom '99 Proceedings of the 5th annual ACM/IEEE international conference on Mobile computing and networking ;1999; pp. 24-35; ACM Digital Library.*

* cited by examiner

FIG.7

| ATTRIBUTE | VALUE |
|---|---|
| VERSION | 3 |
| SERIAL NUMBER | AD384D23 |
| SIGNATURE ALGORITHM | RSA-SHA1 |
| ISSUER | AAA.co.jp |
| EXPIRATION DATE | 2012/8/12 |
| SUBJECT | Tokyo, Japan |
| CN | 172.24.1.12 |
| FRIENDLY NAME | Printer1 |

FIG.17

| ACCOUNT INFORMATION | TYPE |
|---|---|
| Printer A | printer |
| Client A | host |
| Client B | host |
| Printer B | printer |
| Printer SV | host |

FIG.24

| ACCOUNT | PASSWORD | TYPE |
|---|---|---|
| Printer A | 239dd92 | printer |
| Client A | ad238dc | host |
| Client B | fds38sd | host |
| Printer B | s233f | printer |
| Printer SV | se12d | host | ns.
IMAGE FORMING APPARATUS, PRINTING METHOD, AND STORAGE MEDIUM

BACKGROUND OF THE INVENTION

1. Field of the Invention

The present invention relates to an image forming apparatus which securely transmits print data via a network, a printing method, and a storage medium.

2. Description of the Related Art

Conventionally, printing can be performed from a print client personal computer (PC) via a network on a device such as an image forming apparatus connected to the network. In such a case, it is necessary for the print client PC to detect the device on the network, and then to install driver software for using the detected device. A standard technique such as Web Services on Devices (WSD) previously proposed by Microsoft Corporation is a specification for performing the above-described series of processes in a simplified manner. The WSD employs, when the print client PC searches for the device on the network, a WS-Discovery specification. The WS-Discovery specification is defined in http://specs.xml-soap.org/ws/2005/04/discovery/ws-discovery.pdf. Further, the WSD employs a secure WSD specification for encrypting network data to be communicated. The secure WSD specification is defined in http://msdn.microsoft.com/en-us/library/bb204786 (v=VS.85).aspx. The secure WSD specification employs Transport Layer Security (TLS) defined by Request For Comment (RFC) 2246.

In using TLS, the print client PC encrypts network data to prevent falsification and eavesdropping of the network data, and performs certificate verification to prevent spoofing. More specifically, when the print client performs certificate verification, server certificate is signed by a public certificate authority (CA) to assure validity of the server certificate. A CA certificate is stored in the print client, the server certificate is stored in a server, and the server transmits the server certificate to the print client, so that the print client verifies the validity of the certificate.

If the print client is to verify the validity of the server by performing certificate verification using TLS, the CA certificate which has a chain relation with the server certificate is to be stored in the print client. However, such an operation requires the public CA to sign the certificate, or a user to independently organize a private CA and have the certificate signed. As a result, cost and effort are required in performing the operation.

To solve such situation, there is a method in which a self-signed certificate is used in TLS to reduce the load in organizing the above-described environment. In such a case, the situation is solved by storing the self-signed certificate in a server side. Japanese Patent Application Laid-Open No. 2007-334753 discusses an operation using proxy authentication.

However, since there is no CA certificate in a print client side with which the print client can verify the validity of the certificate transmitted from the server, the print client cannot verify the validity. It is thus previously determined whether to continue the process even when the print client side cannot perform verification, or the user is caused to select whether to continue the process when the certificate is received. If the process is to be continued, it indicates that the server has not been authenticated, so that there is a risk of spoofing. In other words, if the self-signed certificate is used in TLS, the operation cost and effort can be reduced. However, there is a risk of spoofing.

SUMMARY OF THE INVENTION

According to an aspect of the present invention, there is provided an image forming apparatus for use in a printing system that includes a print client including a transmission unit configured to transmit to a printer server a print request, a printer server including a receiving unit configured to receive a print request transmitted from the print client, a print request transmission unit configured to transmit, using a secure print protocol employing a certificate, the received print request to an image forming apparatus, and an inquiry unit configured to inquire of an authentication server about validity of a certificate transmitted from an image forming apparatus receiving the print request, and an authentication server including a verification unit configured to verify, based on a certificate of the image forming apparatus that has been registered before inquiring about the validity of the certificate, whether a certificate transmitted according to an inquiry from the printer server is valid. The image forming apparatus includes a policy receiving unit configured transmit authentication information to the authentication server, and to receive policy information transmitted in response to authentication performed based on the authentication information, an enabling unit configured to enable a secure print setting according to a specification in the received policy information indicating that printing is to be performed using a secure print protocol employing a certificate, and a control unit configured to control, in response to the secure print setting becoming enabled, not performing printing in a case where a print request is transmitted without using the secure print protocol employing the certificate, and performing printing in a case where a print request is transmitted using the secure print protocol employing the certificate and the authentication server has verified that the certificate is valid.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of certificate information used in the certificate verification system.

FIG. 17 illustrates an example of account information stored in the authentication server in the certificate verification system according to the first exemplary embodiment.

FIG. 24 illustrates an example of account information stored in the authentication server according to the first exemplary embodiment.

DESCRIPTION OF THE EMBODIMENTS

Various exemplary embodiments, features, and aspects of the invention will be described in detail below with reference to the drawings.

If the self-signed certificate is used in TLS, the operation cost and effort can be reduced. However, there is a risk of spoofing. To solve such situation, Japanese Patent Application Laid-Open No. 2007-334753 discusses a method using proxy authentication.

Figure 1:
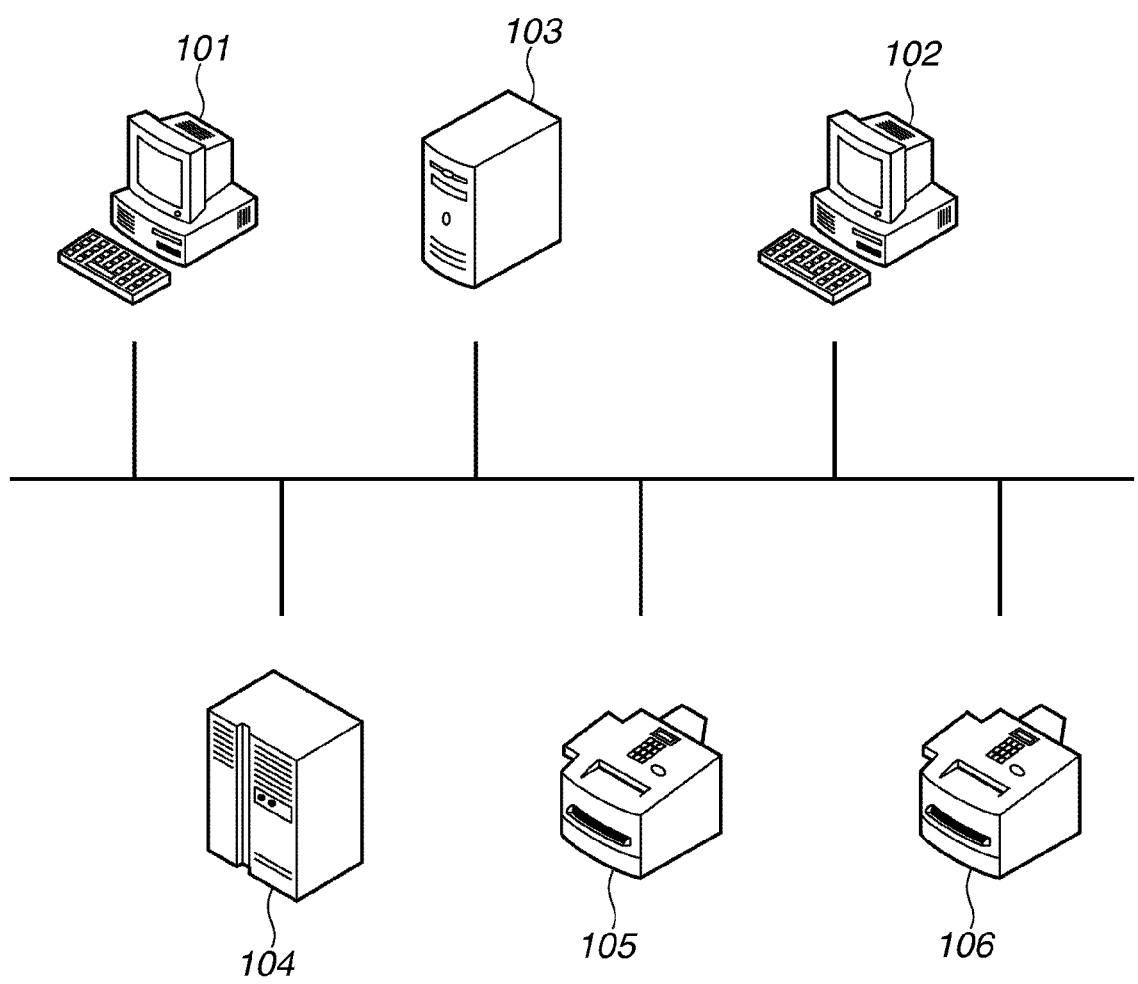
FIG. 1 illustrates an example of a network environment.

There may also be a network printing system as illustrated in FIG. 1 for preventing the risk of spoofing when the self-signed certificate is used, as well as the method discussed in Japanese Patent Application Laid-Open No. 2007-334753. Referring to FIG. 1, the network printing system includes print clients 101 and 102, a printer server 103, an authentication server 104, and image forming apparatuses 105 and 106, which can communicate with one another. There may also be more than two printer clients and image forming apparatuses. Hereinafter, the print client 101 will represent the print clients, and the image forming apparatus 105 will represent the image forming apparatuses. The printer server and the authentication server may be physically separate terminals as illustrated in FIG. 1, or the functions thereof may be including in one terminal.

The authentication server 104 manages the network printing system, and other devices cannot connect to the network environment without the permission of the authentication server 104.

Figure 2:
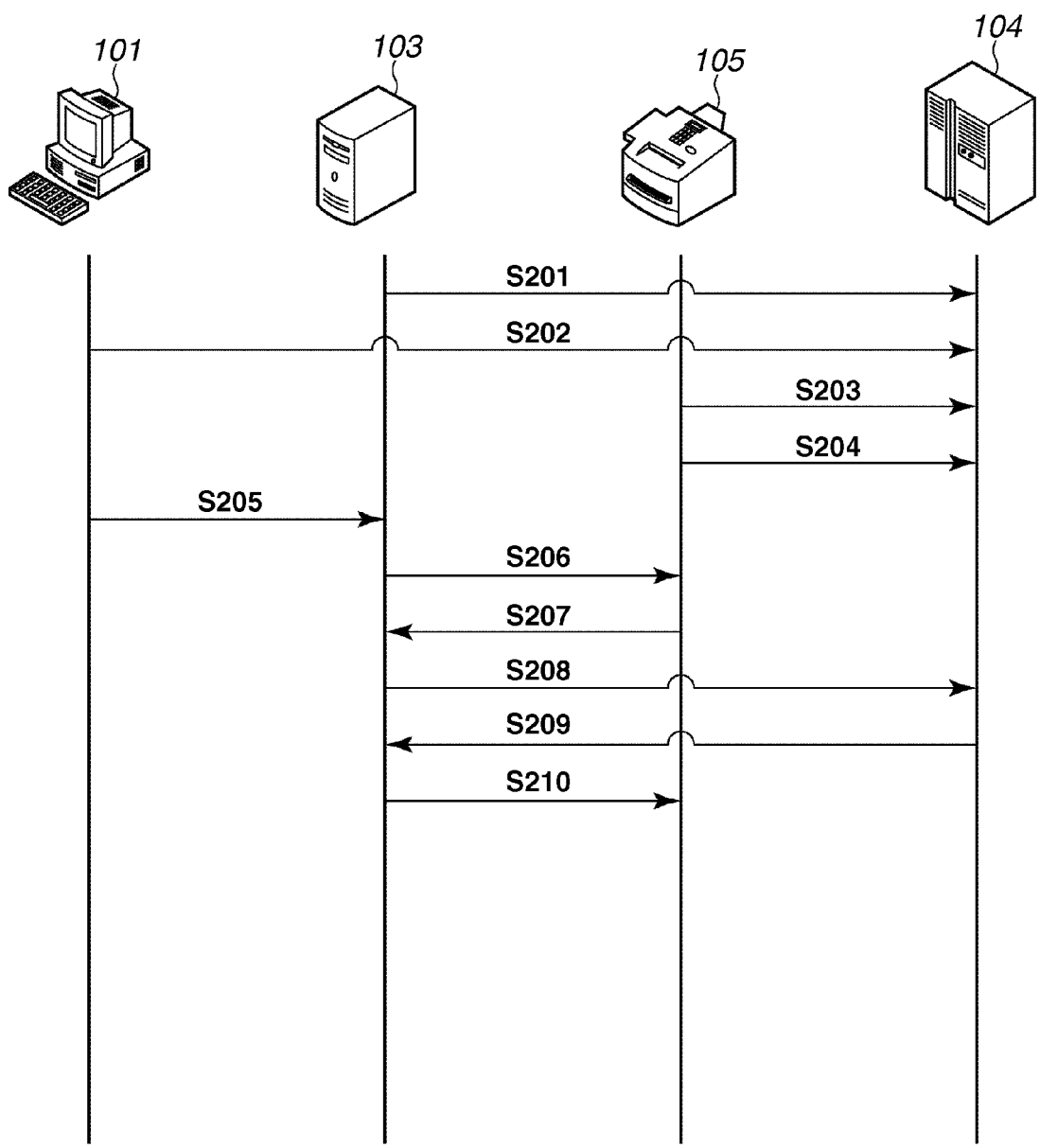
FIG. 2 is a sequence diagram illustrating a printing process performed in a certificate verification system.

FIG. 2 illustrates a flow of the process for verifying the validity of the self-signed certificate performed in the above-described network printing system. The processes are performed by control units realized by central processing units (CPU) included in each of the apparatuses executing programs.

In step S201, the printer server 103 using a network authentication protocol requests connecting to the network environment managed by the authentication server 104. If there is a response from the authentication server 104 permitting connection, the printer server 103 becomes capable of connecting to the network environment. In step S202, the print client 101 using a similar authentication unit connects to the network environment. In step S203, the image forming apparatus using the similar authentication unit connects to the network environment.

The authentication server 104 previously stores an account information data file as illustrated in FIG. 17 and determines whether to permit or deny connection of a terminal based on the file. For example, if the image forming apparatus 105 transmits a connection request using information such as an account "Printer A" and a password "239dd92", the authentication server 104 refers to the file to confirm whether such information is included. The authentication server 104 thus determines to permit or deny connection. A plurality of users may log in and use the print client 101 and the image forming apparatus 105, so that a plurality of accounts and passwords is set to one terminal. The account information file illustrated in FIG. 17 also stores the corresponding number of account information.

In step S204, upon connecting to the network environment, the image forming apparatus 105 registers in the authentication server 104 certificate information to be used in implementing the secure WSD. The certificate information includes attribute information as illustrated in FIG. 7. The certificate information may also include attributes other than those illustrated in FIG. 7, such as an authority key identifier and a certificate revocation list (CRL) distribution point. If the number of attribute information in the certificate information increases, the data size of the certificate information also increases. The certificate information may thus be information which can uniquely identify the certificate, such as hash information of the certificate.

In step S205, if the user instructs printing to be performed, the print client 101 transmits the print request to the printer server 103 instead of directly to the image forming apparatus 105. The communication protocol used between the print client 101 and the printer server 103 is not limited to the WSD protocol. In step S206, upon receiving the print request from the print client 101, the printer server 103 transmits the print request to the image forming apparatus 105 using the secure WSD.

In step S207, the image forming apparatus 105 transmits to the printer server 103 the self-signed certificate to be used in TLS. In step S208, the printer server 103 transmits the certificate information to the authentication server 104 for verifying whether the received certificate is reliable. In step S209, the authentication server 104 verifies whether the received certificate information matches the certificate information previously registered therein, and returns the result of verifying the validity. For example, the authentication server 104 may verify the validity by calculating the hash information from the certificate acquired by the printer server 103 inquiring of the image forming apparatus 105, and comparing the hash information. However, this is not a limitation.

In step S210, if the printer server 103 receives a response indicating that the verification is successful, the printer server 103 determines that the image forming apparatus 105 is a reliable terminal and continues communication. Print data is thus transmitted and received. On the other hand, if the printer server 103 receives a response indicating that the verification has failed, the printer server 103 determines that the image forming apparatus 105 is not a reliable terminal and discontinues communication. It is not necessary to discontinue communication, as long as control is performed so that printing is not executed.

The above-described printing system uses TLS to encrypt a communication path, and is thus capable of preventing eavesdropping and falsification. Further, the above-described printing system uses the authentication server to verify the certificate and thus reduces the risk of spoofing. The printing process is described above with reference to FIG. 2. However, the process illustrated in FIG. 2 may be similarly applied to the case where the printer server 103 installs the image forming apparatus 105 as a printer in the printing system.

Hereinafter, the network printing system illustrated in FIG. 1 will be referred to as a certificate verification system. The image forming apparatus 105 in the verification system includes a function of registering the certificate information in the authentication server 104, in addition to the secure WSD function. Further, the printer server 103 in the verification system includes a function of transmitting, after receiving the certificate, the certificate information to the authentication server 104 and performing certificate verification. The authentication server 104 in the verification system includes a function of receiving registration of the certificate information, storing the certificate information, and verifying the validity of the certificate upon request. Further, the secure WSD corresponds to the secure print protocol. The secure print protocol is not limited to the secure WSD.

Figure 9:
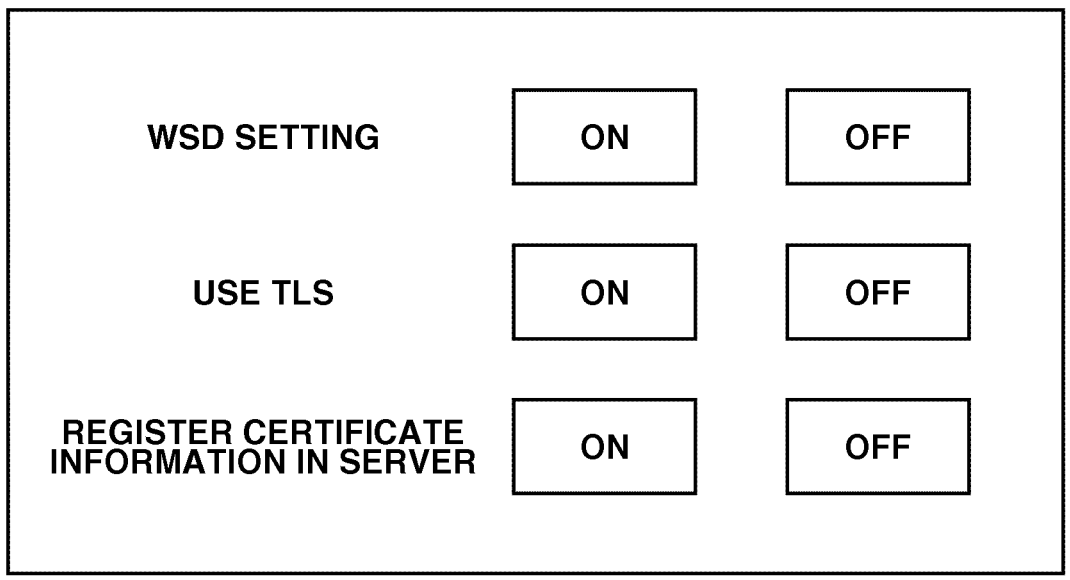
FIG. 9 illustrates an example of a user interface (UI) of the image forming apparatus in the certificate verification system.

However, the above-described certificate verification system is realized only when the user is appropriately enabling a TLS setting of the WSD in the image forming apparatus 105 and a setting for transmitting the certificate information to the authentication server 104. FIG. 9 illustrates an example of the UI in the image forming apparatus 105. Referring to FIG. 9, when the user enables all setting values of "WSD setting", "Use TLS", and "Register certificate information in server", security of the certificate verification system is assured.

Figure 3:
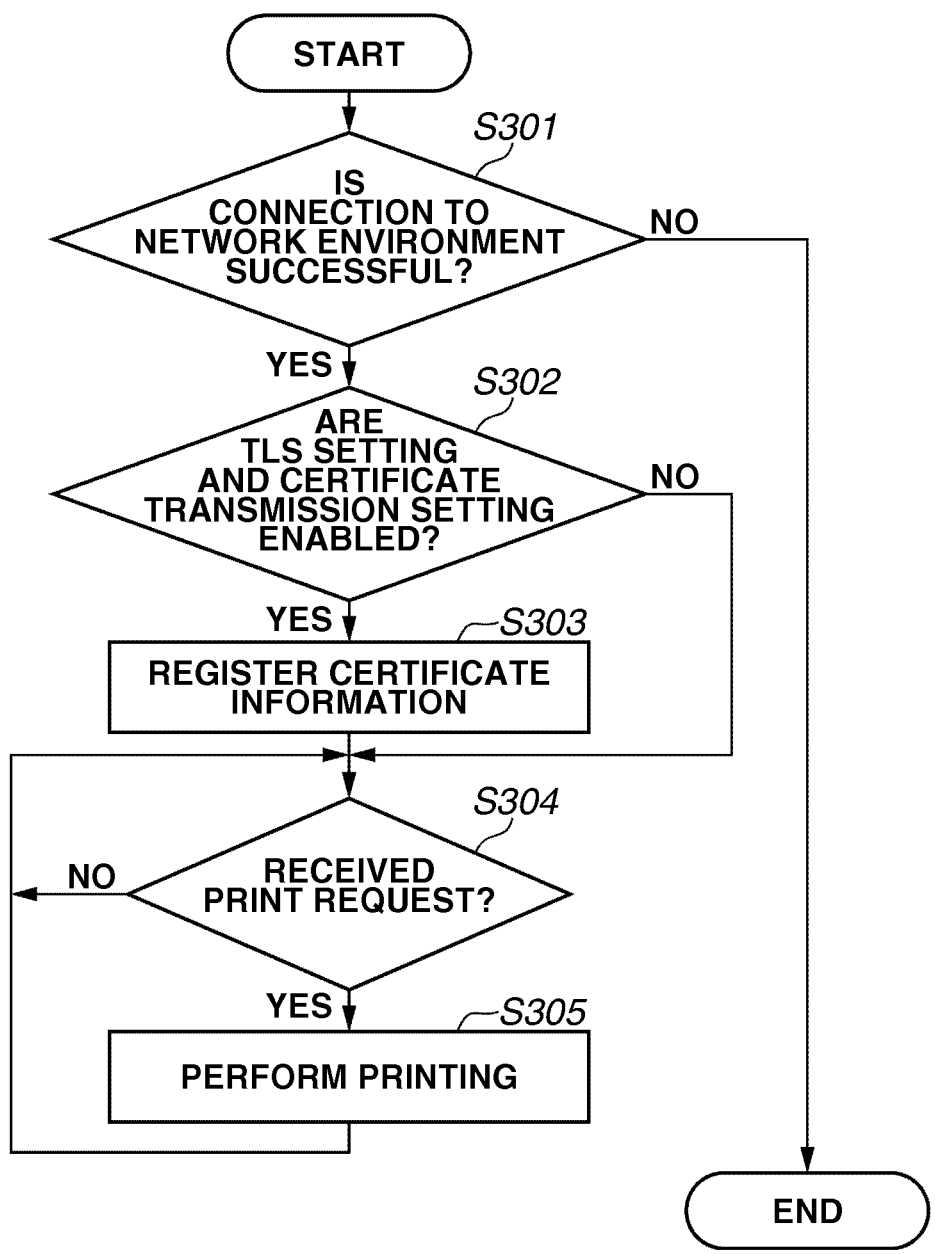
FIG. 3 is a flowchart illustrating a process performed by an image forming apparatus in the certificate verification system.

On the other hand, if the certificate information transmission setting of the image forming apparatus 105 is disabled, the image forming apparatus 105 does not register the certificate in the authentication server 104 after connecting to the network environment (i.e., step S302 illustrated in the flowchart of FIG. 3). In such a case, if the printer server 103 transmits a connection request to the image forming apparatus 105 using TLS, and the image forming apparatus 105 transmits the certificate to the printer server 105, there is no matching certificate information in a certificate database of the authentication server 104. A verification error thus occurs, and connection cannot be established. As a result, if the user incorrectly presets the image forming apparatus 105, communication between the printer server 103 and the image forming apparatus 105 is not established, and printing cannot be performed.

Figure 6:
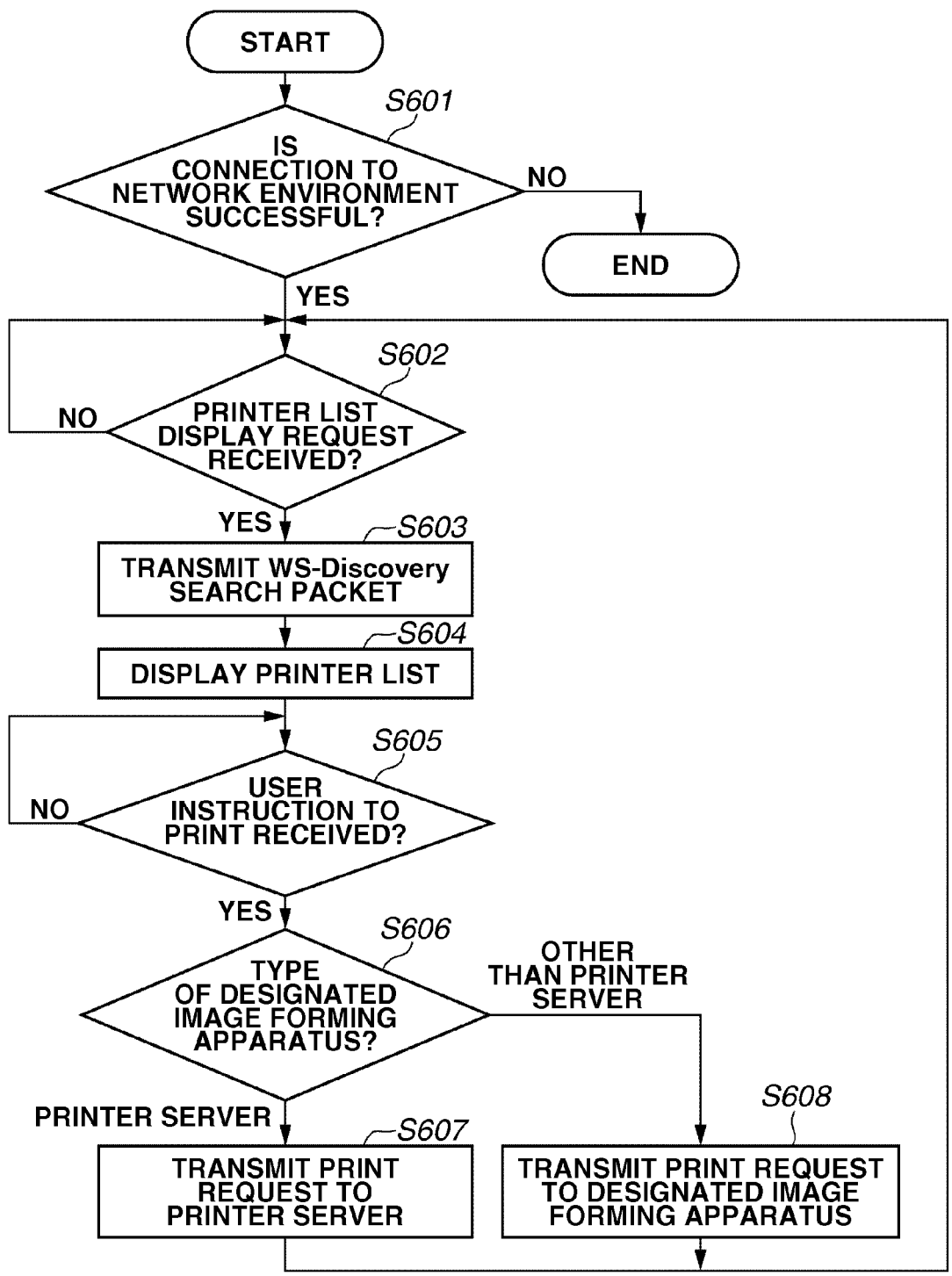
FIG. 6 is a flowchart illustrating a process performed by a print client in the certificate verification system.

Further, if the user is to operate on a print client terminal and perform printing, the user generally opens a network environment list and selects a desired printer from a displayed list of printers (i.e., step S602 illustrated in the flowchart of FIG. 6). In such a case, if the WSD setting of the print client 101 is enabled, i.e., a normal print setting is enabled, the print client 101 transmits a multicast message using WS-Discovery (i.e., step S603 illustrated in FIG. 6). If the network environment includes the image forming apparatus in which the TLS setting is disabled due to the above-described setting error, such an image forming apparatus responds to the message transmitted using WS-Discovery.

The print client 101 then displays on the printer list in the print client side the image forming apparatus which has made a response (i.e., step S604 illustrated in FIG. 6). If the user selects and executes the printing process on the image forming apparatus which has made the response, WSD printing using plain text is communicated. As a result, there may be a risk of eavesdropping and falsification of the network data regardless of introduction of the certificate verification system (i.e., step S606 and step S608 illustrated in FIG. 6).

The secure print setting indicates a setting for performing printing using the secure print protocol employing certificates, such as the secure WSD protocol. According to the present exemplary embodiment, printing using the secure print protocol is performed by enabling at least two settings, i.e., the setting "Use TLS" and the setting "Register certificate information in server". The secure print setting thus indicates including both settings. According to the present exemplary embodiment, two settings are enabled. However, if there is only one item, such as "secure WSD setting", it is only necessary to enable one setting. In such a case, the secure print setting indicates a state including one such item.

FIG. 3 is a flowchart illustrating the process performed by the control unit in the image forming apparatus 105 after the image forming apparatus 105 has been switched on. In step S301, the control unit transmits a connection request to the authentication server 104 to connect to the network environment. If there is a response from the authentication server 104 permitting connection (YES in step S301), the process proceeds to step S302.

In step S302, the control unit refers to the TLS setting value and the setting value on whether to register the certificate information in the authentication server 104. FIG. 9 illustrates an example of the setting values. If the TLS setting is enabled and the setting for registering the certificate information in the authentication server 104 is enabled (YES in step S302), the process proceeds to step S303. In step S303, the control unit registers in the authentication server 104 the certificate information to be used in TLS. If the TLS setting is disabled, or there is no setting to register the certificate information in the authentication server 104 (NO in step S302), the registration process is not performed.

In step S304, the control unit determines whether a print request is received. If the print request is received (YES in step S304), the process proceeds to step S305, and printing is performed. If the certificate is once generated, it is not necessary to register the certificate when the image forming apparatus 105 is subsequently switched on. Further, if the above-described settings are changed from "enabled" to "disabled", the certificate may be deleted from the authentication server 104. If the setting then becomes enabled, the certificate may be re-registered.

Figure 4:
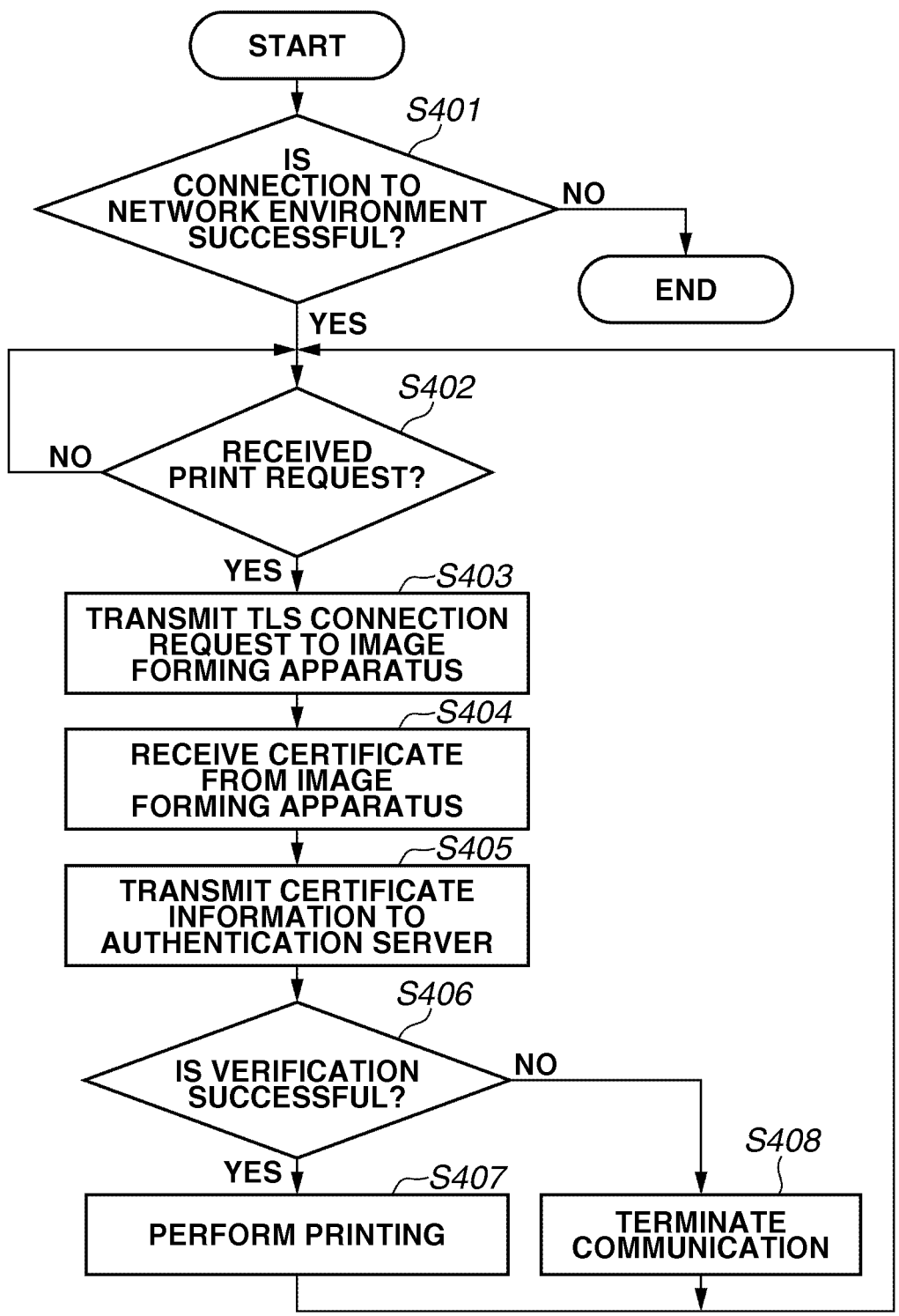
FIG. 4 is a flowchart illustrating a process performed by a printer server in the certificate verification system.

FIG. 4 is a flowchart illustrating the process performed by the control unit in the printer server 103 after the printer server 103 has been switched on. In step S401, the control unit transmits a connection request to the authentication server 104 to connect to the network environment. If there is a response from the authentication server 104 permitting connection (YES in step S401), the process proceeds to step S402.

In step S402, the control unit waits to receive a print request from the print client 101. If the control unit receives the print request (YES in step S402), the process proceeds to step S403. In step S403, the control unit transmits a TLS connection request to the designated image forming apparatus 105. In step S404, the control unit receives the certificate from the image forming apparatus 105 in a TLS negotiation. In step S405, the control unit then extracts the certificate information from the received certificate and transmits the certificate information to the authentication server 104.

In step S406, the control unit receives the response from the authentication server 104 on the result of verifying the validity of the certificate. If the verification is successful (YES in step S406), the process proceeds to step S407. In step S407, the control unit ends the TLS negotiation and continues printing. On the other hand, if the verification has failed (NO in step S406), the process proceeds to step S408. In step S408, the control unit ends the TLS negotiation as an error, and terminates the printing process. If the print request is not within the TLS negotiation, the printing process is normally performed.

Figure 5:
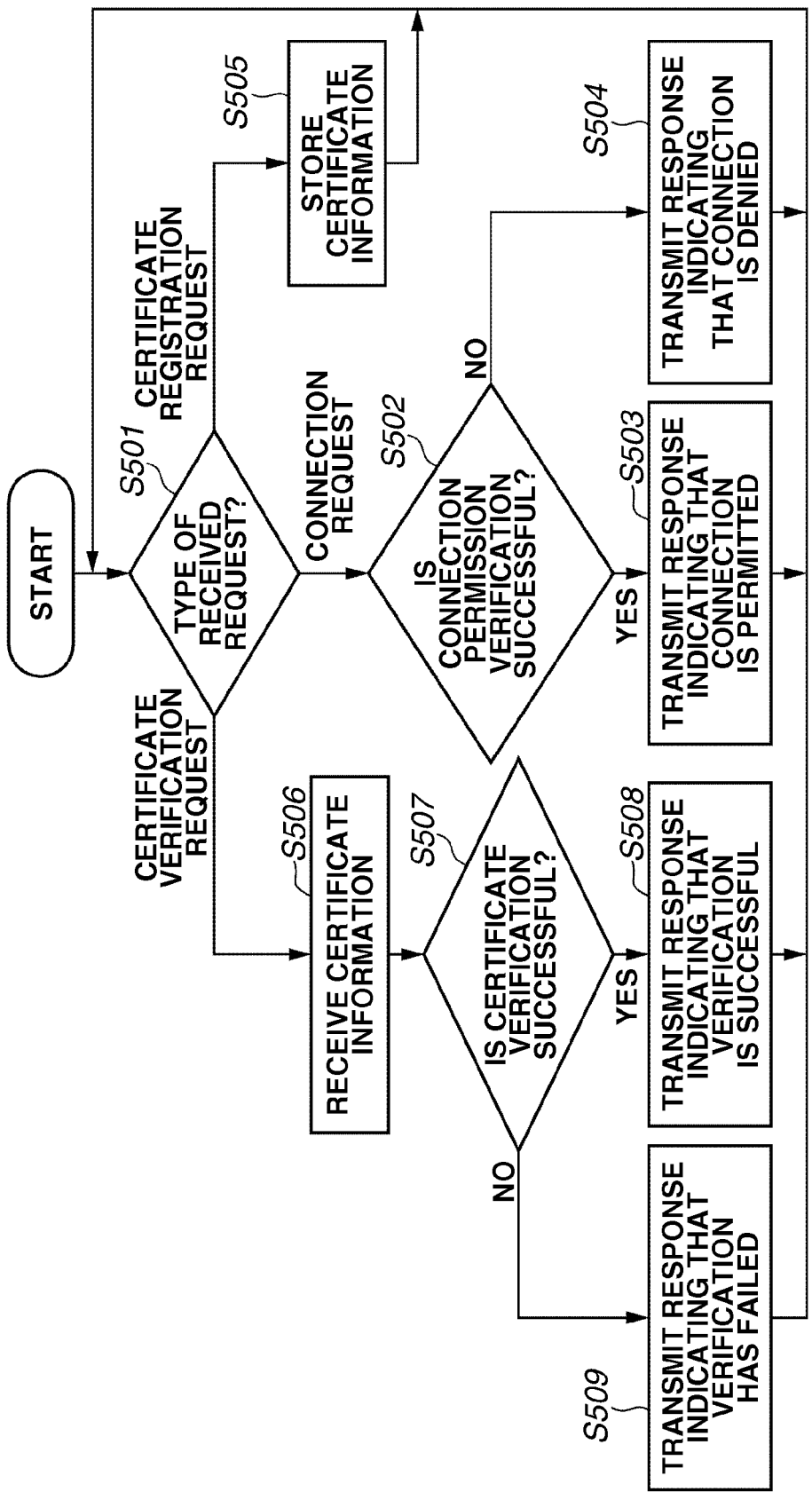
FIG. 5 is a flowchart illustrating a program performed by an authentication server in the certificate verification system.

FIG. 5 is a flowchart illustrating the process performed by the control unit in the authentication server 104 after the authentication server 104 has been switched on. In step S501, the authentication server 104 waits to receive a request from a terminal connected to the network environment managed thereby. If a request to connect to the network environment is received from the terminal (CONNECTION REQUEST in step S501), the process proceeds to step S502.

In step S502, the control unit determines whether to permit connection by referring to a connection permission criteria set to the authentication server 104. The connection permission criteria may previously define and store in the authentication server 104 a file of a list of terminals which are permitted connection. The control unit may also determine using the network authentication protocol such as digest authentication. If the control unit permits connection (YES in step S502), the process proceeds to step S503. In step S503, the control unit transmits a response indicating that connection is permitted, and performs access control so that the terminal can connect to the network environment. If the control unit denies connection (NO in step S502), the process proceeds to step S504. In step S504, the control unit transmits a response indicating that connection is denied, and performs access control so that the terminal cannot connect to the network environment.

If the control unit receives a certificate registration request from the terminal (CERTIFICATE REGISTRATION REQUEST in step S501), the process proceeds to step S505. In step S505, the control unit then stores the certificate information. If the control unit receives a certificate verification request from the terminal (CERTIFICATE VERIFICATION REQUEST in step S501), the process proceeds to step S506. In step S506, the control unit receives the certificate information. In step S507, the control unit then verifies the certificate. If the certificate verification is successful (YES in step S507), the process proceeds to step S508. In step S508, the control unit transmits to the terminal transmitting the request a response indicating that verification is successful. If the certificate verification has failed (NO in step S507), the process proceeds to step S509. In step S509, the control unit transmits to the terminal transmitting the request a response indicating that verification has failed.

FIG. 6 is a flowchart illustrating the process performed by the control unit in the print client 101 after the print client 101 has been switched on. In step S601, the control unit transmits a connection request to the authentication server 104 to connect to the network environment. If there is a response from the authentication server 104 permitting connection (YES in step S601), the process proceeds to step S602.

Figure 8:
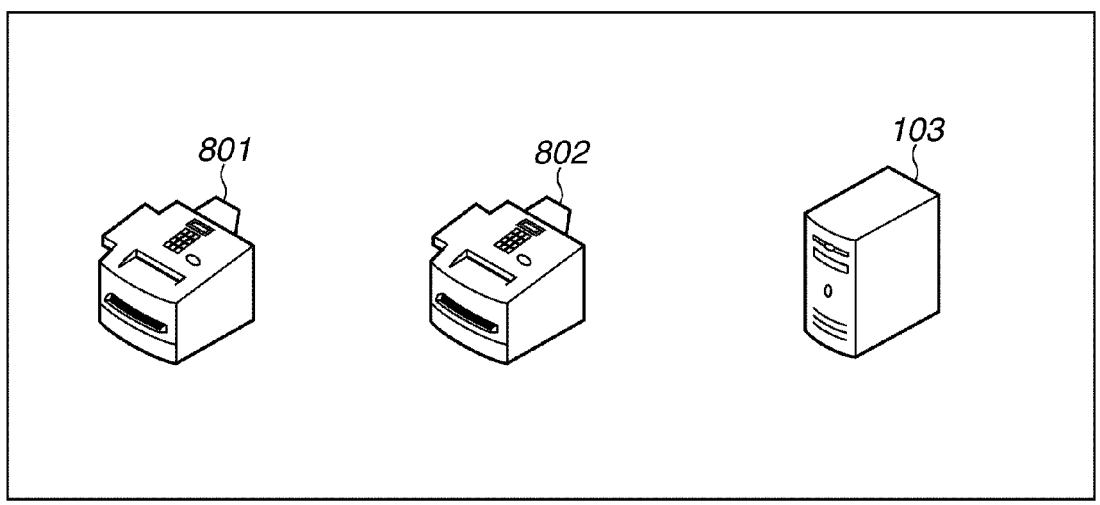
FIG. 8 illustrates an example of a printer list screen in the certificate verification system.

In step S602, the print client 101 waits to receive a request from the user to display the printer list. If the print client 101 receives the request (YES in step S602), the process proceeds to step S603. In step S603, if the print client includes the WSD function, and the print client receives the request to display the printer list, the control unit transmits a WS-Discovery search packet using multicasting. In step S604, the control unit displays as a list as illustrated in FIG. 8, image forming apparatuses 801 and 802 which responded to the WS-Discovery search, and a printer server 803 previously added to the printer list.

In step S605, the control unit determines whether the user has instructed printing. If the user has instructed printing (YES in step S605), the process proceeds to step S606. In step S606, the control unit determines whether the designated image forming apparatus is the image forming apparatus searched using the WS-Discovery search packet, or the printer server. If the designated image forming apparatus is the image forming apparatus 801 or 802 searched using the WS-Discovery search packet (OTHER THAN PRINTER SERVER in step S606), the process proceeds to step S608. In step S608, the control unit performs the printing process using WSD communication employing plain text. If the designated image forming apparatus is the printer server (PRINTER SERVER in step S606), the process proceeds to step S607. In step S607, the control unit transmits the print request to the printer server 803.

If the image forming apparatus in the certificate verification system environment is incorrectly preset, the printer server cannot communicate with the image forming apparatus. Such situation can be solved by applying the present invention to the image forming apparatus 105 and the authentication server 104. The method for solving such situation will be described in detail below.

The configuration of the network printing system according to the first exemplary embodiment of the present invention will be described below with reference to FIG. 1. According to the present exemplary embodiment, an Active Directory Server will be used as the authentication server, and an Active Directory (registered trademark) environment as the network environment. The authentication server may also be a Radius authentication server, and the network environment may also be Institute of Electrical and Electronics Engineers (IEEE) 802.001X access control environment. Further, according to the present exemplary embodiment, the WSD is used as the print protocol.

Figure 10:
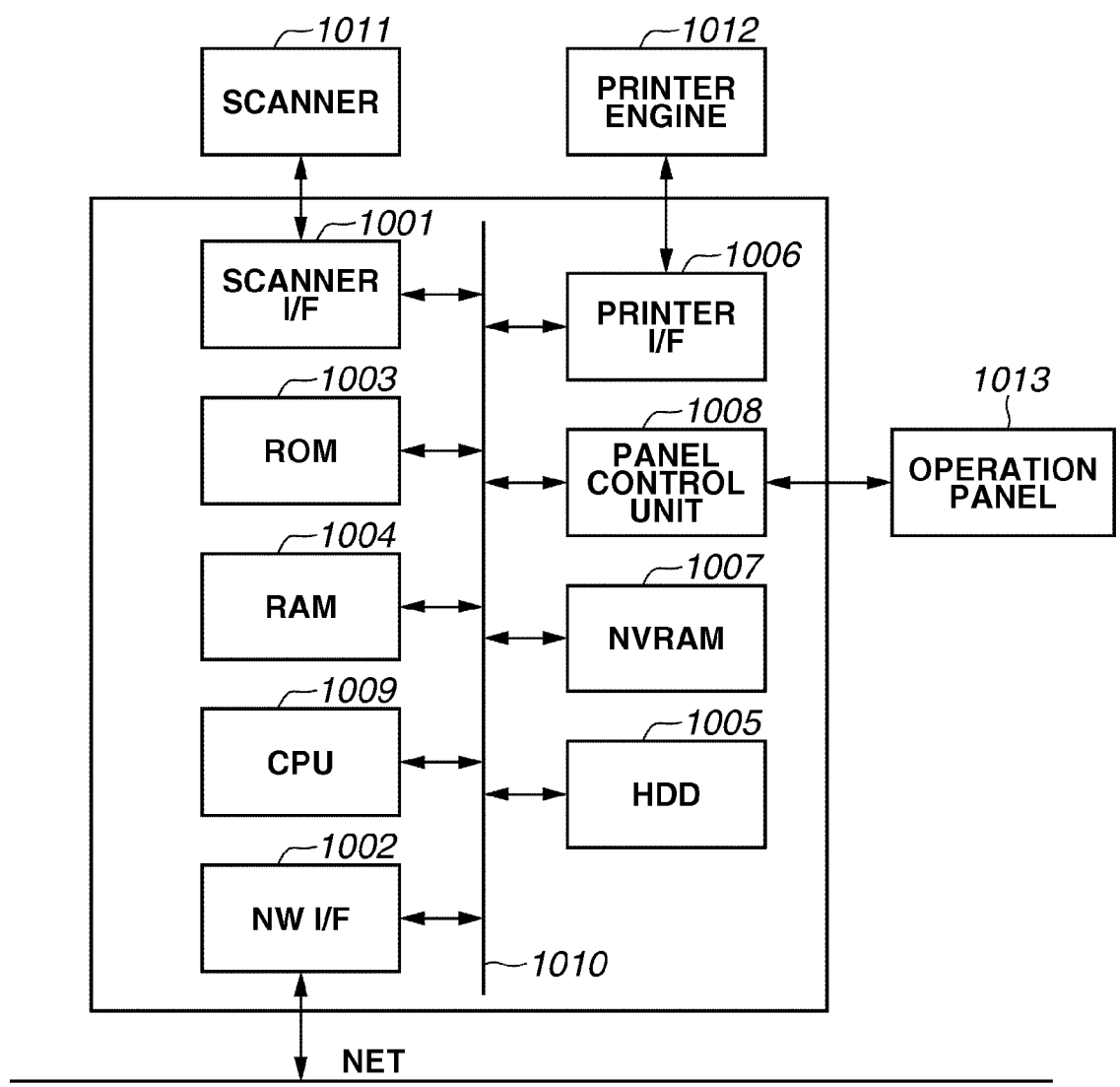
FIG. 10 illustrates a hardware configuration of the image forming apparatus according to a first exemplary embodiment of the present invention.

FIG. 10 is a block diagram illustrating the hardware configuration of the image forming apparatus 105 according to the first exemplary embodiment. Referring to FIG. 10, a read-only memory (ROM) 1003 includes a program ROM which stores control programs executable by a CPU 1009, and a data ROM which stores information used in the image forming apparatus 105.

The CPU 1009 collectively controls, based on the control programs stored in the program ROM in the ROM 1003, access to the various devices connected to a system bus 1010. Further, the CPU 1009 outputs to a printer engine 1012 connected via a printer interface (I/F) 1006, image signals as output information, and controls the image signals input from a scanner 1011 connected via a scanner I/F 1001.

A random access memory (RAM) 1004 mainly functions as a main memory and a work area of the CPU 1009. An option RAM connected to an extension port (not illustrated) may increase memory capacity of the RAM 1004. A hard disk (HDD) 1005 stores font data, an emulation program, and form data, and is used as a job storing area which temporarily spools a print job so that the spooled job is externally controlled. Further, the HDD 1005 is used as a BOX data storing area which stores as BOX data, image data read using the scanner 1011 and the image data of the print job, so that the data can be referred to and be printed from the network. A non-volatile memory (NVRAM) 1007 stores via a panel control unit 1008 various setting information set on an operation panel 1013. A network (NW) I/F 1002 communicates data with an external network via a network cable.

Figure 11:
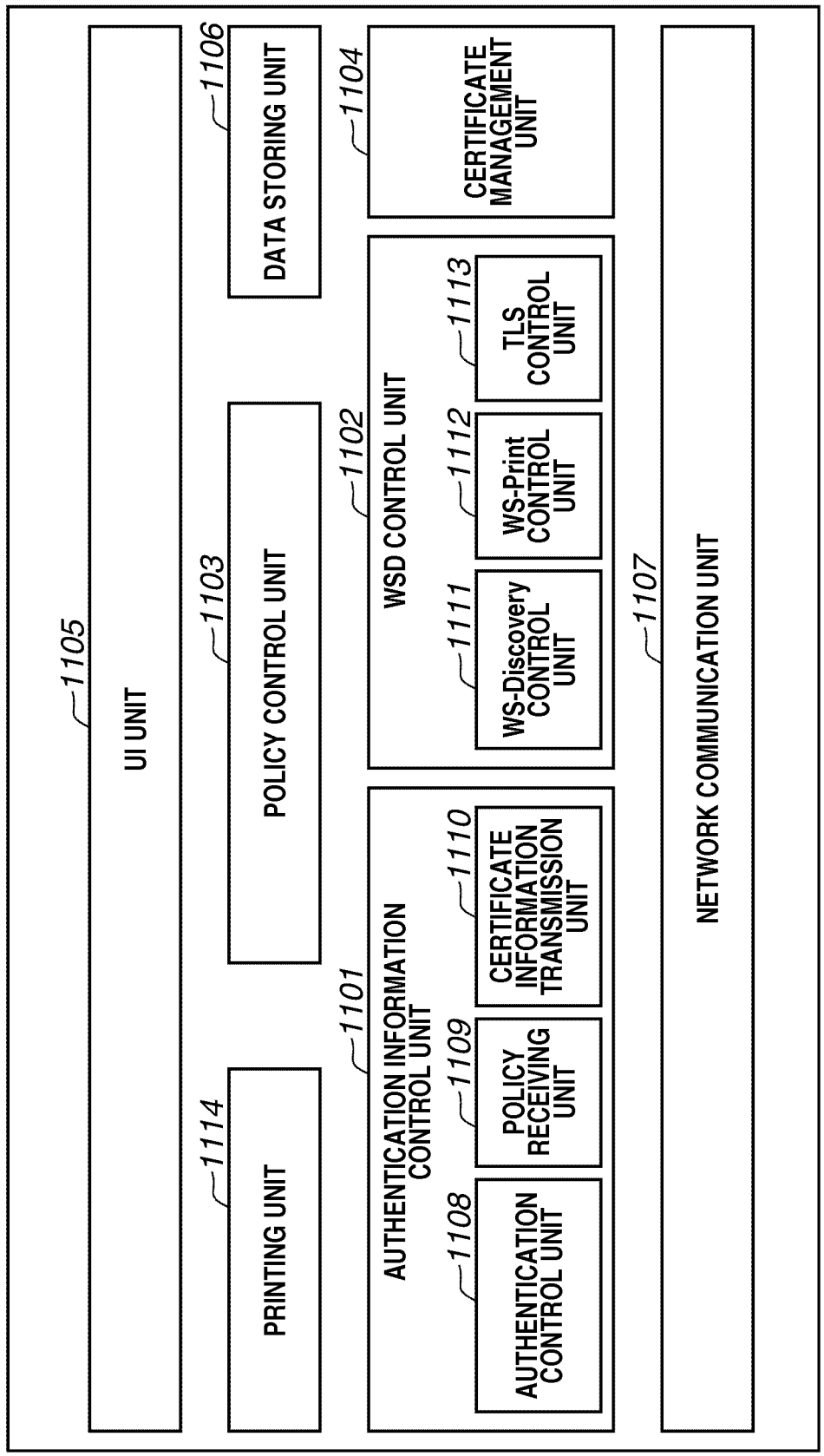
FIG. 11 illustrates a software configuration of the image forming apparatus according to the first exemplary embodiment.

FIG. 11 is a block diagram illustrating the software configuration of the image forming apparatus 105 according to the first exemplary embodiment. Each of processing units illustrated in FIG. 11 are realized by the CPU executing the programs for realizing the processing units. Referring to FIG. 11, the image forming apparatus 105 mainly includes an authentication information control unit 1101, a WSD control unit 1102, a policy control unit 1103, a certificate management unit 1104, a UI unit 1105, a data storing unit 1106, and a network communication unit 1107.

The authentication information control unit 1101 includes an authentication control unit 1108, a policy receiving unit 1109, and a certificate information transmission unit 1110. The authentication control unit 1108 transmits to an Active Directory Server 1304 illustrated in FIG. 13 a request for permitting connection, and interprets the response. The policy receiving unit 1109 receives from the Active Directory Server 1304 and notifies the policy control unit 1103 of the group policy information. The certificate information transmission unit 1110 extracts from the certificate stored in the data storing unit 1106 and registers in the Active Directory Server 1304 the certificate information.

The policy control unit 1103 interprets the received group policy information. The policy control unit 1103 then determines according to the provision of the policy information, whether to instruct the certificate management unit 1104 to generate the certificate, the WSD control unit 1102 to enable each function, and the authentication information control unit 1101 to transmit the certificate information.

The WSD control unit 1102 includes a WS-Discovery control unit 1111, a WS-Print control unit 1112, and a TLS control unit 1113. The WS-Discovery control unit 1111 performs WS-Discovery transmission and interprets the response. The WS-Print control unit 1112 controls the image forming apparatus designated by the user to perform printing using WSD. The TLS control unit 1113 performs, if the TLS setting is enabled, WSD communication using the certificate stored in the data storing unit 1106.

The certificate management unit 1104 generates the self-signed certificate according to the instruction from the UI unit 1105 and the policy control unit 1103, and stores the certificate in the data storing unit 1106. Further, the certificate management unit 1104 stores externally-generated certificates in the data storing unit 1106, and deletes the certificates stored in the data storing unit 1106. The UI unit 1105 displays internal setting values and reflects instructions input by the user in the setting values. The data storing unit 1106 controls the non-volatile memory which stores the certificates and the various settings.

The network communication unit 1107 is a network protocol stack, and controls network communication between external terminals. A printing unit 1114 receives a print request from the print client 101 or the printer server 103 and performs printing.

Figure 12:
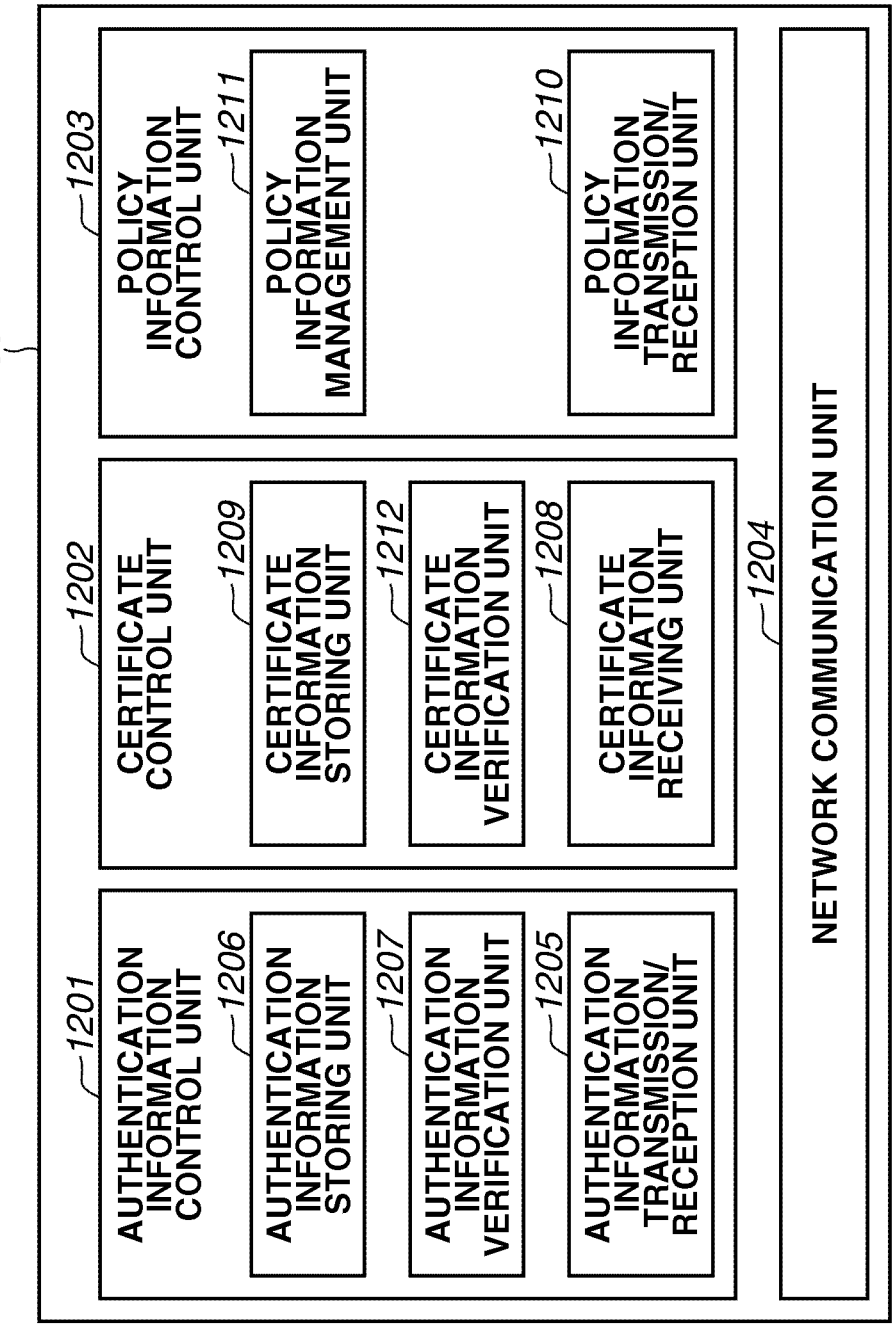
FIG. 12 illustrates the software configuration of the authentication server according to the first exemplary embodiment.

FIG. 12 is a block diagram illustrating the software configuration of the Active Directory Server 1304 according to the first exemplary embodiment. Each of the processing units illustrated in FIG. 12 are realized by the CPU executing the programs for realizing the processing units. Referring to FIG. 12, the Active Directory Server 1304 includes an authentication information control unit 1201, a certificate control unit 1202, a policy information control unit 1203, and a network communication unit 1204.

The authentication information control unit 1201 includes an authentication information transmission/reception unit 1205, an authentication information storing unit 1206, and an authentication information verification unit 1207. The authentication information transmission/reception unit 1205 receives from the external terminal a request to permit connection to the network, and transmits the response. The authentication information storing unit 1206 stores a list of information on the terminals that are permitted to connect to the network. The terminal information list is a list file including account names and passwords. The authentication information verification unit 1207 refers to the authentication information storing unit 1206 and determines whether to permit connection, based on the authentication information received from the external terminal.

The certificate control unit 1202 includes a certificate information receiving unit 1208, a certificate information storing unit 1209, and a certificate information verification unit 1212. The certificate information receiving unit 1208 receives the certificate information transmitted from the external terminal, and stores the certificate information in the certificate information storing unit 1209. The certificate information storing unit 1209 stores the received certificate information. The certificate information verification unit 1212 receives from the external terminal a certificate information verification request, and verifies the received certificate information by comparing with the certificate information stored in the certificate storing unit 1209.

Figure 16:
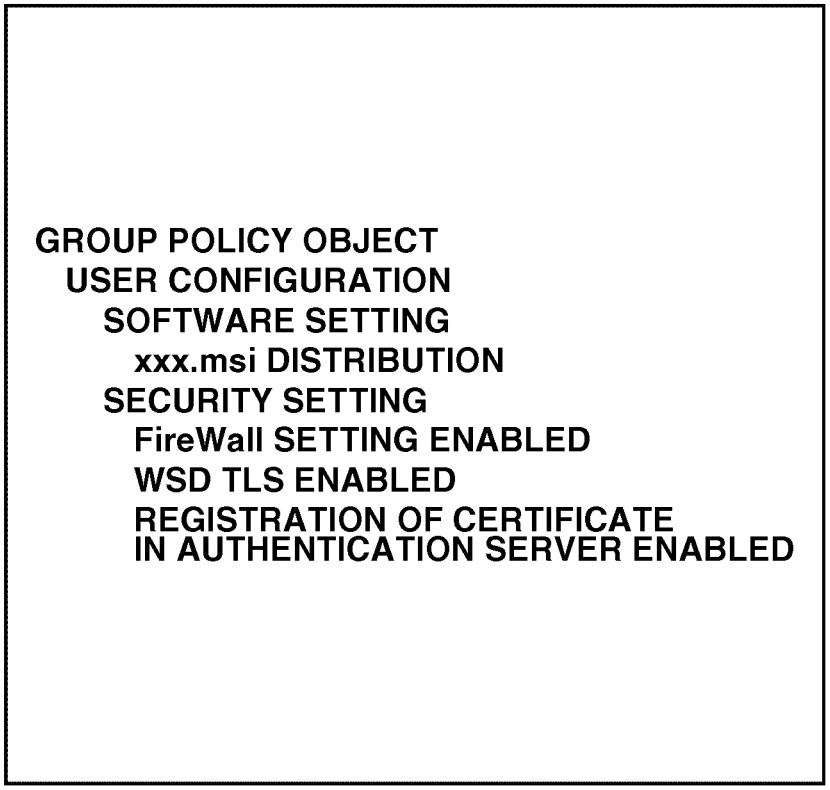
FIG. 16 illustrates an example of group policy information transmitted by the authentication server according to the first exemplary embodiment.

The policy information control unit 1203 includes a policy information transmission/reception unit 1210 and a policy information management unit 1211. The policy information transmission/reception unit 1210 receives from the external terminal a policy information request, and transmits the corresponding policy information. The policy information management unit 1211 stores the various pieces of policy information managed by the Active Directory Server 1304. FIG. 16 illustrates an example of the group policy information managed by the Active Directory Server 1304. Referring to FIG. 16, the Active Directory Server 1304 distributes to the terminals the policy information in which a Fire Wall setting, a WSD TLS setting, and registration of the certificate information in the authentication server are enabled. The network communication unit 1204 is a network protocol stack which controls network communication with the external terminals.

Figure 13:
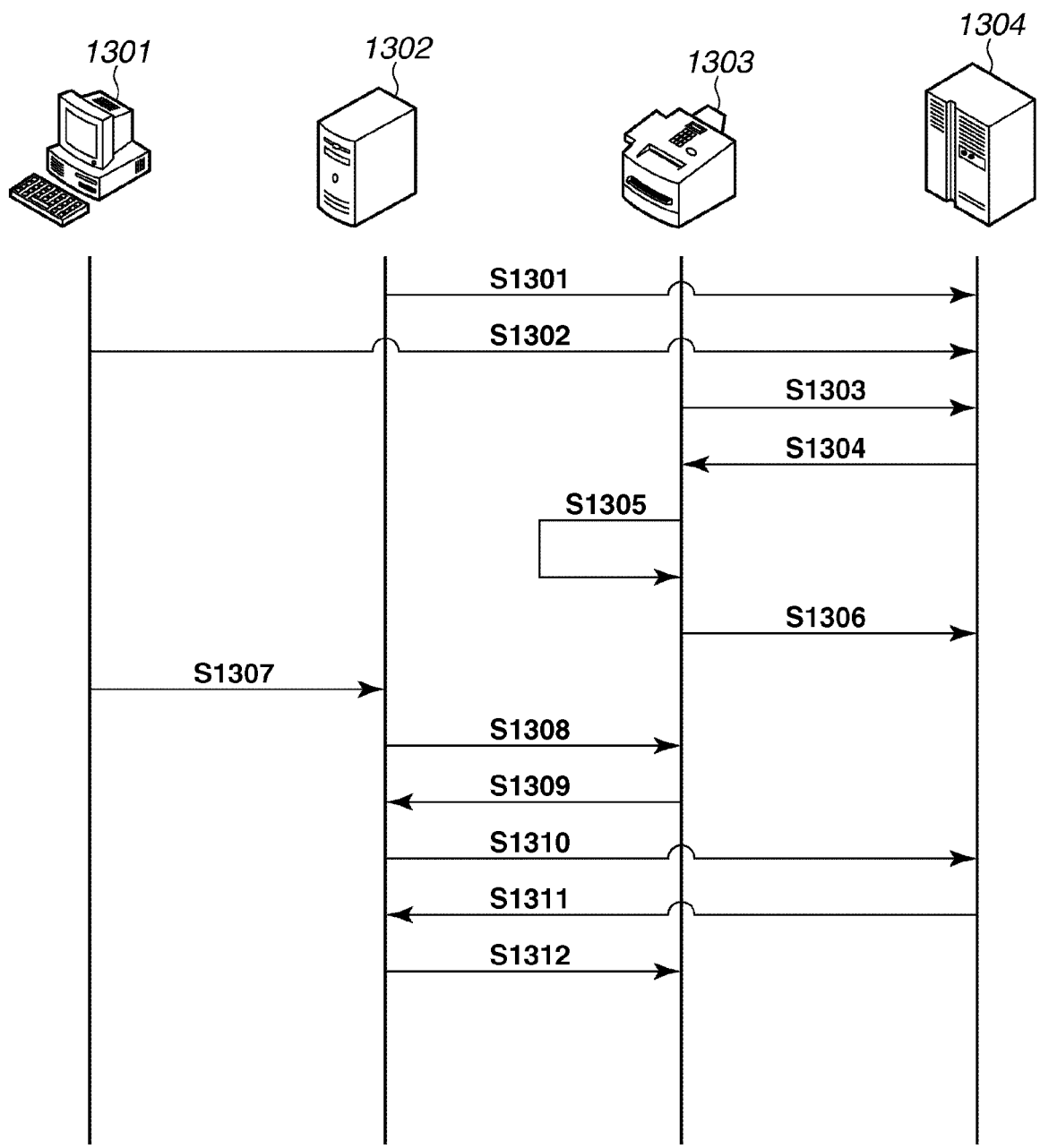
FIG. 13 is a sequence diagram illustrating the printing process performed according to the first exemplary embodiment.

FIG. 13 is a sequence diagram illustrating the operations in the network environment including an image forming apparatus 1303, a printer server 1302, the Active Directory Server 1304, and a print client 1301 according to the first exemplary embodiment. It is assumed that the WSD-TLS setting and the setting for transmitting the certificate information to the Active Directory Server in the image forming apparatus 1303 are disabled.

The processes performed for requesting connection to the network environment in step S1301 to step S1303 are similar to those performed in step S201 to step S203 in the sequence diagram illustrated in FIG. 2. In step S1304, the Active Directory Server 1304 transmits to the terminals requesting connection, the group policy information on "Fire Wall setting enabled" and "registration of the certificate information enabled" as illustrated in FIG. 16. The image forming apparatus 1303 then enables the TLS setting and the certificate information transmission setting which had been disabled, according to the received group policy.

In the above-described case, if the certificate to be used in TLS is not set in the image forming apparatus 1303, the image forming apparatus 1303 generates the self-signed certificate. In the case where the rule for implementing the certificate is predetermined in the certificate verification system, the image forming apparatus 1303 generates the certificate according to the rule. According to the present exemplary embodiment, the certificate is generated based on the rule in which the Internet protocol (IP) address of the image forming apparatus 1303 is stored in a common-name (CN) attribute of the certificate. Further, the account name of the image forming apparatus 1303 for connecting to the network environment is stored in a friendly name attribute. The certificate information managed by the Active Directory Server 1304 can thus be easily associated with the account information based on the above-described rules.

The subsequent processes performed in step S1306 to step S1312 are similar to those performed in step S204 to step S210 in the sequence diagram illustrated in FIG. 2.

According to the above-described process, the image forming apparatus 1303 registers the certificate information in the Active Directory Server 1304. As a result, there is no disconnection, which may conventionally occur due to a failure in the TLS negotiation with the printer server 1302. Further, since the TLS setting in the image forming apparatus 1303 is enabled, the image forming apparatus 1303 does not respond even when the print client transmits the WS-Discovery search packet. The print client 1301 thus cannot directly discover the image forming apparatus 1303, so that WSD printing using plain text is not performed. According to the present exemplary embodiment, the image forming apparatus 1303 in the certificate verification system environment operates in an appropriate operation mode by referring to the group policy even when the image forming apparatus 1303 is inappropriately set. Security can thus be maintained without appropriately presetting the image forming apparatus 1303.

Figure 14:
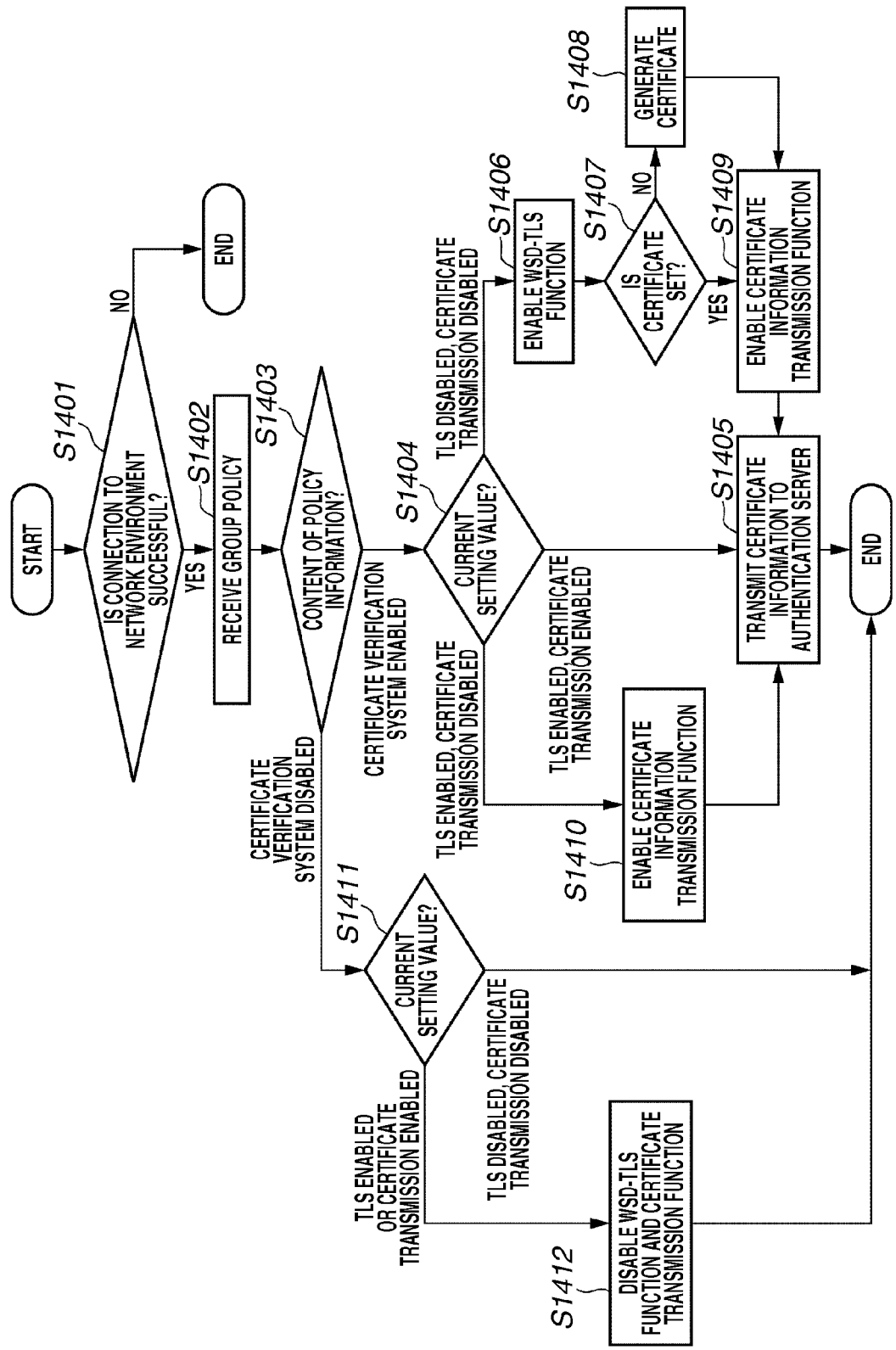
FIG. 14 is a flowchart illustrating a process performed by the image forming apparatus according to the first exemplary embodiment.

FIG. 14 is a flowchart illustrating the processes performed by each of the processing units in the image forming apparatus 1303 illustrated in FIG. 11 after the image forming apparatus 1303 has been switched on according to the first exemplary embodiment. In step S1401, the image forming apparatus 1301 transmits the connection request to the Active directory Server 1304 for connecting to the network environment. If there is a response from the Active directory Server 1304 permitting connection (YES in step S1401), the process proceeds to step S1402. In step S1402, the policy receiving unit 1109 receives the group policy information.

In step S1403, the policy control unit 1103 determines the group policy information. If the policy control unit 1103 determines that the TLS and the certificate information transmission settings are enabled in the environment (CERTIFICATE VERIFICATION SYSTEM ENABLED in step S1403), the process proceeds to step S1404. In step S1404, the policy control unit 1103 refers to the data storing unit 1106 and determines the current settings.

If the TLS setting is disabled and the function of transmitting the certificate information is disabled (TLS DISABLED, CERTIFICATE TRANSMISSION DISABLED in step S1404), the process proceeds to step S1406. In step S1406, the policy control unit 1103 instructs the TLS control unit 1113 to enable the TLS function, and the TLS control unit 1113 receiving the instruction enables the TLS function.

In step S1407, the policy control unit 1103 refers to the certificate management unit 1104 and the data storing unit 1106 and determines whether the certificate to be used in TLS is set. If the certificate is not set (NO in step S1407), the process proceeds to step S1408. In step S1408, the policy control unit 1103 instructs the certificate management unit 1104 to generate the self-signed certificate, and the certificate management unit 1104 generates the certificate. In step S1409, the certificate information transmission unit 1110 enables the function of transmitting the certificate information. In step S1405, the certificate information transmission unit 1110 transmits the certificate information to the Active Directory Server 1304.

On the other hand, if the TLS setting is enabled and the function of transmitting the certificate information is disabled in the image forming apparatus 1303 (TLS ENABLED, CERTIFICATE TRANSMISSION DISABLED in step S1404), the process proceeds to step S1410. In step S1410, since it is not necessary to enable the TLS setting, the policy control unit 1103 instructs the certificate information transmission unit 1110 to enable the function of transmitting the certificate information. Upon receiving the instruction, the certificate information transmission unit 1110 enables the function of transmitting the certificate information. In step S1405, the certificate information transmission unit 1110 transmits the certificate information to the Active Directory Server 1304. If the TLS setting and the function of transmitting the certificate information are both enabled in the image forming apparatus 1303 (TLS ENABLED, CERTIFICATE TRANSMISSION ENABLED in step S1404), it is not necessary to change the settings. The process thus proceeds to step S1405, and the above-described process is performed.

If the policy control unit 1103 determines that the TLS and the certificate information transmission settings are disabled in the environment (CERTIFICATE VERIFICATION SYSTEM DISABLED in step S1403), the process proceeds to step S1411. In step S1411, the policy control unit 1103 refers to the data storing unit 1106 and confirms the current settings. If either the TLS setting or the certificate information transmission function is enabled (TLS ENABLED OR CERTIFICATE TRANSMISSION ENABLED in step S1411), the process proceeds to step S1412. In step S1412, the policy control unit 1103 instructs the TLS control unit 1113 and the certificate transmission control unit 1110 to disable the functions. Upon receiving the instruction, the TLS control unit 1113 and the certificate transmission control unit 1110 disable the TLS function and the transmission function.

Figure 15:
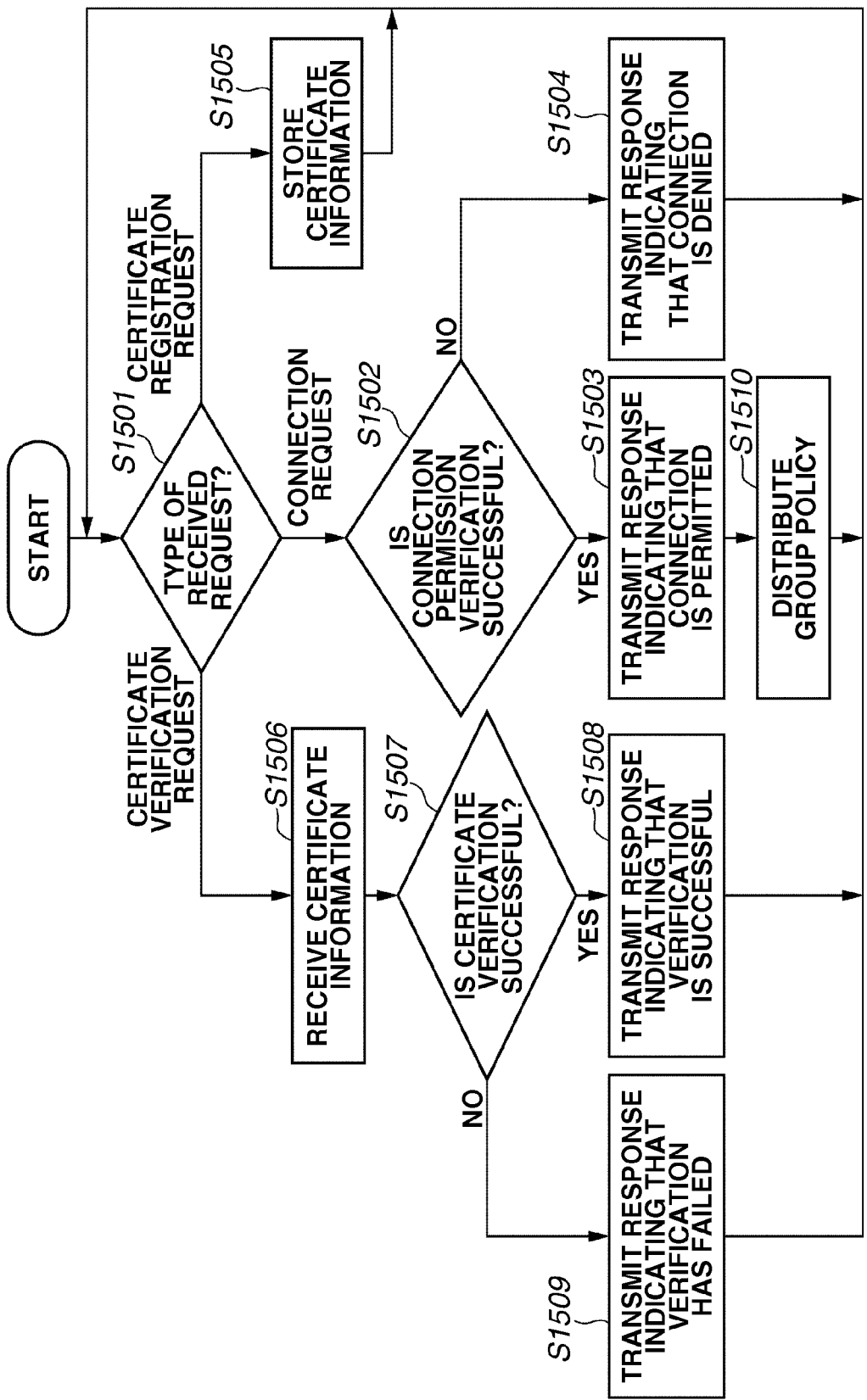
FIG. 15 is a flowchart illustrating a process performed by the authentication server according to the first exemplary embodiment.

FIG. 15 is a flowchart illustrating the processes performed by each of the processing units in the Active Directory Server 1304 illustrated in FIG. 12 when the Active Directory Server 1304 has been switched on. The processes performed in step S1501 to step S1509 are similar to those performed in step S501 to step S509 in the flowchart illustrated in FIG. 5. If the Active Directory Server 1304 permits connection in step S1503, in step S1510, the policy information management unit 1211 transmits the group policy information via the policy information transmission unit 1210.

According to the present exemplary embodiment, the Active Directory Server 1304 is to transmit the policy information, such as on the TLS setting and the certificate registration function enabled setting, only to the image forming apparatus 1303. Since the other terminals, e.g., the print client 1301, do not include such setting values, it is not necessary to transmit the policy information to the terminals.

The account information file illustrated in FIG. 17 is thus expanded into a file as illustrated in FIG. 24, which includes type information in addition to the account information of the terminals. Such data is previously stored in the Active Directory Server 1304, so that whether to transmit the policy information may be determined by confirming the type of the terminal which has transmitted the connection request. For example, if the image forming apparatus 1303 has transmitted the connection request using the account information "Printer B", the Active Directory Server 1304 refers to the list illustrated in FIG. 24 previously set thereto, and determines the type of the terminal. The Active Directory Server 1304 thus transmits the policy information only when there is a connection request from the terminals whose type is "printer".

Figure 18:
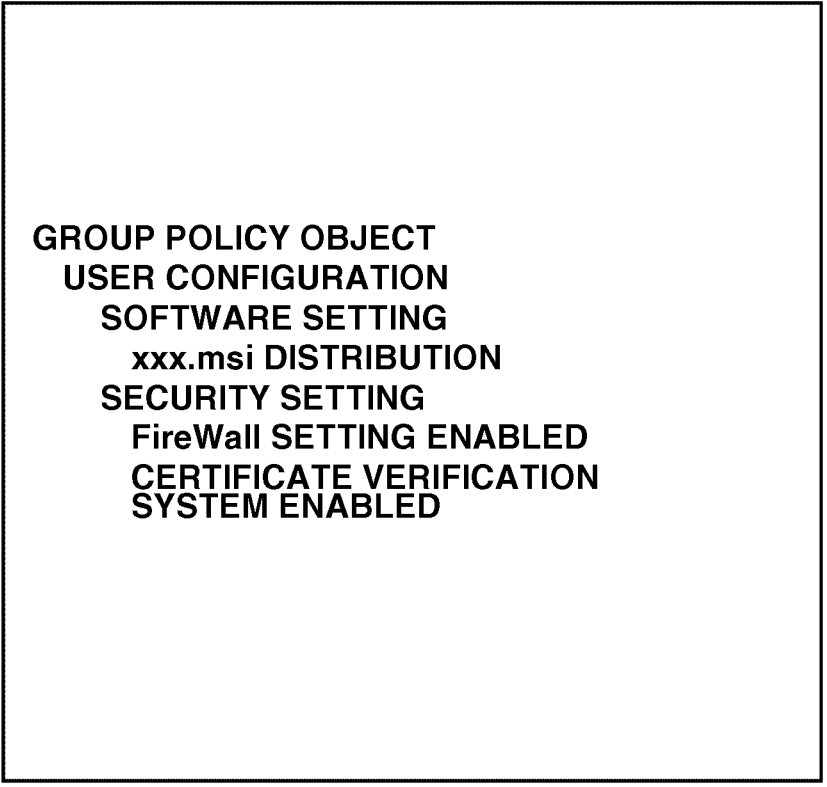
FIG. 18 illustrates an example of the group policy information transmitted by the authentication server according to the first exemplary embodiment.

Further, the group policy information may be defined as a generalized item, such as "certificate verification system enabled", illustrated in FIG. 18. If the image forming apparatus 1303 receives such policy information, the image forming apparatus 1303 determines that the certificate verification system is enabled in the network environment, and enables the TLS setting and the certificate information transmission function. The terminals such as the print client 1301 in the certificate verification system environment operate according to the specification and the setting of the certificate verification system. As a result, the Active Directory Server 1304 can constantly transmit such a generalized item regardless of the terminal type.

When a secure print setting in the image forming apparatus is disabled, the print client directly transmits the print request in plain text to the image forming apparatus, so that the print data may be eavesdropped. According to a second exemplary embodiment, the present invention is applied to the print client 101 and the authentication server 104 to solve such situation.

The operations of the authentication server 104 according to the second exemplary embodiment are similar to those according to the first exemplary embodiment. Further, the operations of the image forming apparatus 105 and the printer server 103 are similar to those of the certificate verification system, so that a detailed description on the functions thereof will be omitted.

The network printing system according to the second exemplary embodiment will be described below with reference to FIG. 1. According to the present exemplary embodiment, the Active Directory Server is used as the authentication server, and the Active Directory environment as the network environment.

Figure 19:
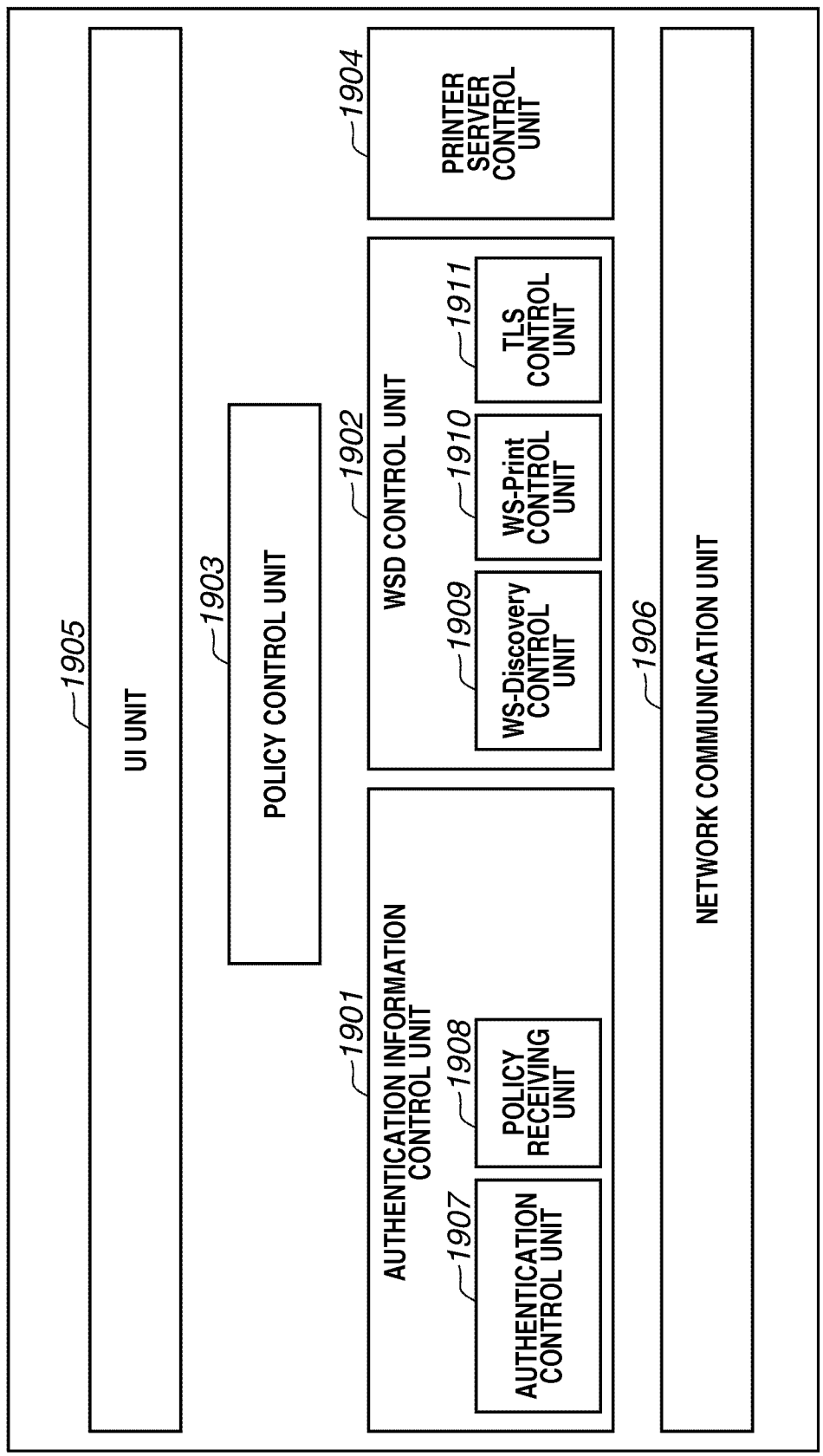
FIG. 19 illustrates the software configuration of the print client according to a second exemplary embodiment of the present invention.

FIG. 19 is a block diagram illustrating the software configuration of the print client 101 according to the second exemplary embodiment. Each of the processing units illustrated in FIG. 19 are realized by the CPU executing the programs for realizing the processing units. Referring to FIG. 19, the print client 101 mainly includes an authentication information control unit 1901, a WSD control unit 1902, a policy control unit 1903, a printer server control unit 1904, a UI unit 1905, and a network communication unit 1906.

The authentication information control unit 1901 includes an authentication control unit 1907 and a policy receiving unit 1908. The authentication control unit 1907 transmits to an Active Directory Server 2004 illustrated in FIG. 20 the connection permission request, and interprets the response. The policy receiving unit 1908 receives from the Active Directory Server 2004 and notifies the policy control unit 1903 of the group policy information.

The policy control unit 1903 interprets the received group policy information, and then determines according to the policy information, whether to instruct the WSD control unit 1902 to enable or disable each function. The WSD control unit 1902 includes a WS-Discovery control unit 1909, a WS-Print control unit 1910, and a TLS control unit 1911. The WS-Discovery control unit 1909 transmits the WS-Discovery search packet and interprets the response. The WS-Print control unit 1910 controls the image forming apparatus designated by the user to perform printing using WSD. The TLS control unit 1911 performs, if the TLS setting is enabled, the WSD communication using the TLS. The UI unit 1905 displays the internal setting values and reflects instructions input by the user in the setting values. The network communication unit 1906 is a network protocol stack, and controls network communication between the external terminals.

Figure 20:
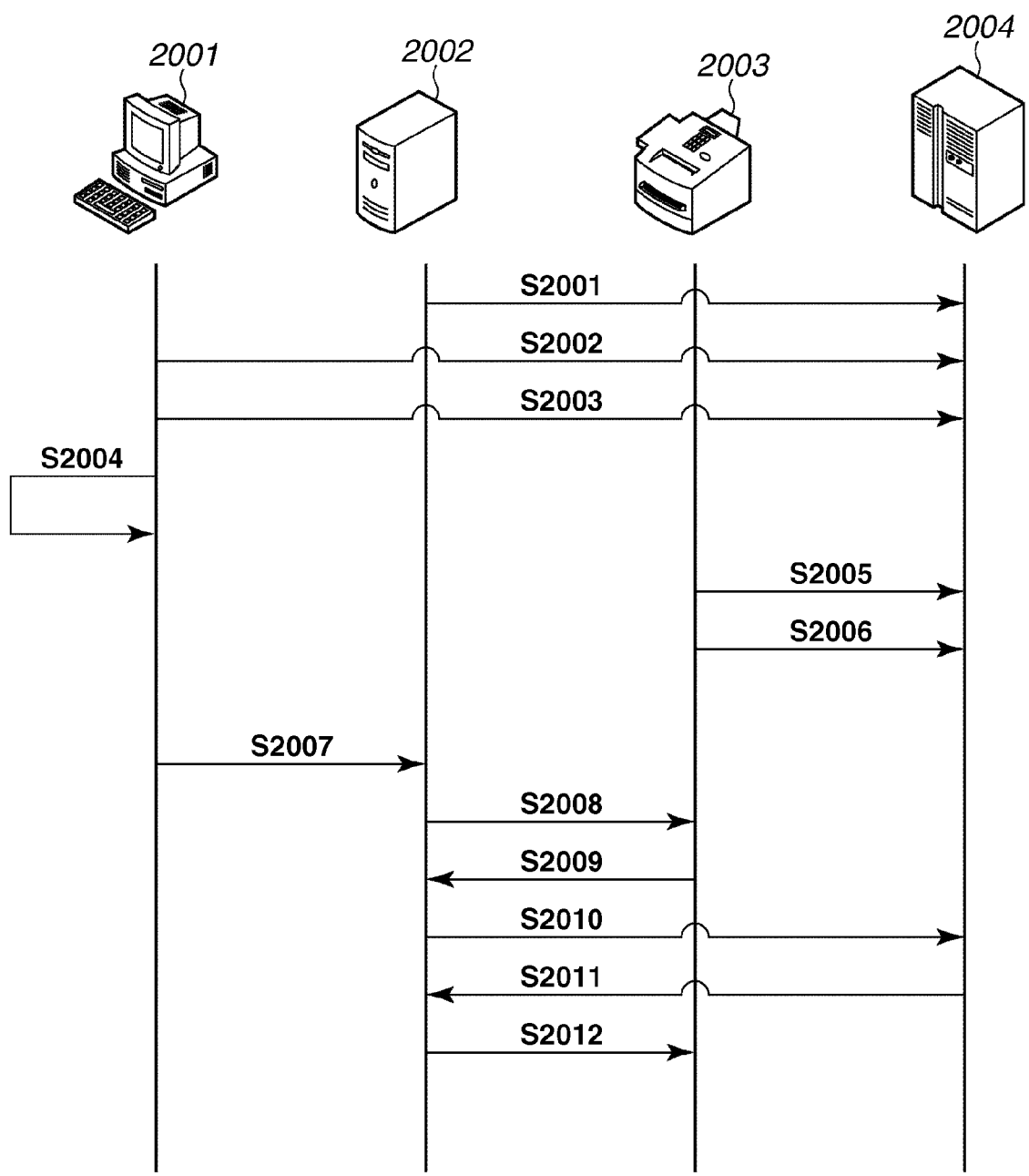
FIG. 20 is a sequence diagram illustrating the printing process performed according to the second exemplary embodiment of the present invention.

FIG. 20 is a sequence diagram illustrating the operations in the network environment including a print client 2001, the Active Directory Server 2004, a printer server 2002, and an image forming apparatus 2003 according to the second exemplary embodiment. The process for requesting connection to the network environment performed in step S2001 is similar to that performed in step S201 in the sequence diagram illustrated in FIG. 2.

In step S2002, the print client 2001 transmits to the Active Directory Server 2004 the request to connect to the network environment. If the Active Directory Server 2004 determines to permit connection, in step S2003, the Active Directory Server 2004 transmits the response on permitting connection, and the group policy information on "certificate verification system enabled" as illustrated in FIG. 18. The print client 2001 then switches to the setting appropriate for the certificate verification system environment according to the received group policy information, and performs operations.

If the client 2001 receives the policy information indicating that the certificate verification system environment is enabled, the print client 2001 disables the WS-Discovery function and a WS-Print function. The subsequent processes performed in step S2005 to step S2012 are similar to those performed in step S203 to step S210 in the sequence diagram illustrated in FIG. 2. Further, if the print client 2001 receives the policy information indicating that the certificate verification system environment is disabled, there is no particular need to change the settings, so that the print client 2001 operates according to default settings.

Figure 21:
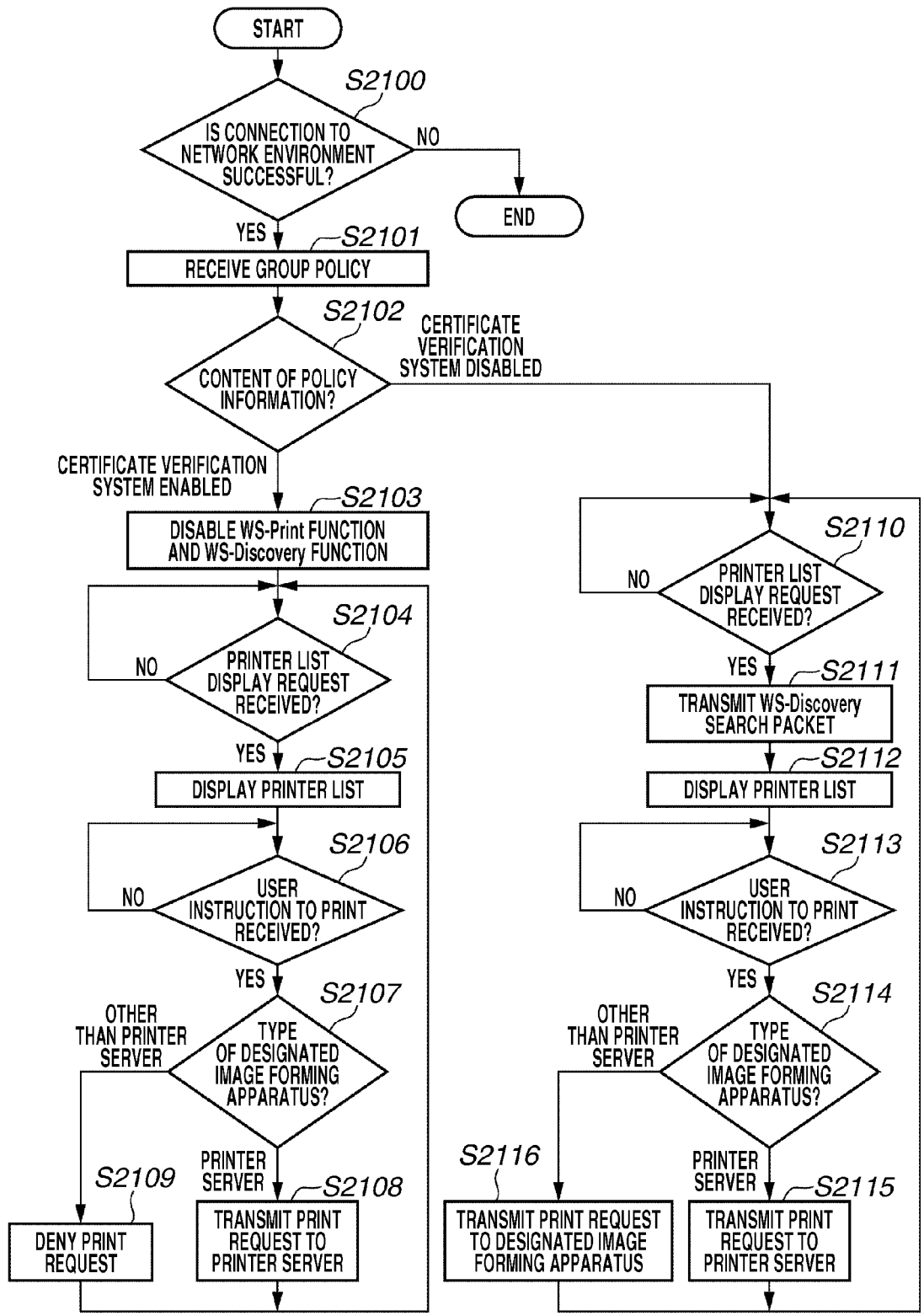
FIG. 21 is a flowchart illustrating a process performed by the print client according to the second exemplary embodiment of the present invention.

FIG. 21 is a flowchart illustrating the process performed by each of the processing units in the print client 2001 illustrated in FIG. 19 when the print client 2001 has been switched on according to the second exemplary embodiment. In step S2100, the print client 2001 transmits to the Active Directory Server 2004 the request to permit connection to the network environment. If the Active Directory Server 2004 permits connection to the network environment (YES in step S2100), the process proceeds to step S2101.

In step S2101, the policy receiving unit 1908 receives the group policy information from the Active Directory Server 2004. The policy receiving unit 1908 then transfers the received group policy information to the policy control unit 1903. In step S2102, the policy control unit 1903 interprets the content of the received group policy information. If the group policy indicates that the certificate verification system is enabled in the environment (CERTIFICATE VERIFICATION SYSTEM ENABLED in step S2102), the process proceeds to step S2103. In step S2103, the policy control unit 1903 instructs the WSD control unit 1902 to terminate the function. More specifically, the WSD control unit 1902 disables the WS-Discovery function and the WS-Print function. In step S2104, the print client 2001 waits for the printer list display request to be received from the user.

In step S2105, upon receiving the printer list display request from the user, the print client 2001 displays the preset printer list. Since the WS-Discovery function is disabled, the print client 2001 does not transmit a packet for searching the image forming apparatus. As a result, an image forming apparatus that performs plain text response is not discovered, so that communication is not performed in plain text.

In step S2106, the print client 2001 waits for a print request to be received from the user. In step S2107, upon receiving the print request from the user, the print client 2001 determines whether the designated image forming apparatus is the printer server 2002. If the designated image forming apparatus is the printer server (PRINTER SERVER in step S2107), the process proceeds to step S2108. In step S2108, the print client 2001 transmits to the printer server 2002 the print request using TLS. If the designated image forming apparatus is a terminal other than the printer server (OTHER THAN PRINTER SERVER in step S2107), the process proceeds to step S2109. In step S2109, since the WS-Print function is disabled, the print client 2001 denies the print request, and prevents printing from being performed without using the certificate verification system. If the image forming apparatus transmits a response indicating permission to the print request transmitted from a terminal other than the printer server, printing is performed using plain text communication. In such a case, there is a risk of eavesdropping and falsification of the print data.

If the policy receiving unit 1908 receives the group policy information indicating that the certificate verification system is disabled in the environment (CERTIFICATE VERIFICATION SYSTEM DISABLED in step S2102), the process proceeds to step S2110. The subsequent processes performed in step S2110 to step S2116 are similar to those performed in step S602 to step S608 in the flowchart illustrated in FIG. 6.

According to the present exemplary embodiment, the print client 2001 disables the WS-Discovery function and the WS-Print function according to the group policy. As a result, the print client 2001 becomes unable to directly search for or print on the image forming apparatus in the certificate verification system. The print client 2001 is thus prevented from performing plain text communication even when the certificate verification environment is inappropriately set so that an image forming apparatus permits plain text communication, and security is maintained.

Further, the present exemplary embodiment is effective only when the print client 2001 is logged into the Active Directory environment. When the print client 2001 has logged out from the Active Directory environment, it becomes unnecessary to operate according to the specification of the certificate verification system, so that the print client 2001 operates by returning to the default settings.

According to the first exemplary embodiment, the Active Directory Server 1304 is certificate verification system-compatible. However, if the Active Directory Server 1304 does not include the group policy transmission function, the image forming apparatus 1303 cannot determine whether the certificate verification system in the connected environment is enabled. According to a third exemplary embodiment of the present invention, a method for the image forming apparatus 1303 to appropriately determine the environment in such a case will be described below.

If the image forming apparatus 1303 cannot acquire the group policy information after logging into the Active Directory environment, the image forming apparatus 1303 registers the certificate information in the Active Directory Server 1304. If registration is successful, the image forming apparatus 1303 determines that the certificate verification system is enabled in the environment. The image forming apparatus 1303 thus enables the TLS function therein, and does not respond to the WSD request using plain text. If registration has failed, the image forming apparatus 1303 determines that the certificate verification system is disabled in the environment. The image forming apparatus 1303 thus disables the TLS function therein, and responds to the WSD request using plain text.

According to the first exemplary embodiment, the Active Directory Server 1304 is certificate verification system-compatible. However, if the Active Directory Server 1304 does not include the group policy transmission function, the image forming apparatus 1303 cannot determine whether certificate verification system in the connected environment is enabled. According to a fourth exemplary embodiment of the present invention, a method for the image forming apparatus 1303 to appropriately determine the environment in such a case will be described below.

If the image forming apparatus 1303 cannot acquire the group policy information after logging into the Active Directory environment, the image forming apparatus 1303 enables a TLS-WSD request waiting function and a plain text-WSD request waiting function. Since the printer server 1302 in the certificate verification system has added the image forming apparatus 1303 in the printer list, the printer server 1302 regularly transmits to the image forming apparatus 1303 a status acquisition request in TLS. When the image forming apparatus 1303 receives the request in TLS from the printer server 1302, the image forming apparatus 1303 determines that the certificate verification system is enabled in the environment. In such a case, the image forming apparatus 1303 disables the plain text-WSD request waiting function, and registers the certificate information in the Active Directory Server 1304. Such a process is realized in the case where the image forming apparatus 1303 receives the request from the printer server 1302 before receiving the plain text-WSD request.

According to the first exemplary embodiment, the image forming apparatus 1303 is certificate verification system-compatible. However, the image forming apparatus 1303 may not include a function of receiving the group policy and switching between enabling and disabling the functions according to the policy information. In such a case, if the certificate transmission function setting in the image forming apparatus 1303 is disabled, the image forming apparatus 1303 does not transmit the certificate information to the Active Directory Server 1304 even if the Active Directory Server 1304 transmits the group policy. As a result, TLS communication between the printer server 1302 and the image forming apparatus 1303 is not established, so that communication cannot be performed.

According to a fifth exemplary embodiment of the present invention, a unit which causes the Active Directory Server 1304 to appropriately switch the setting of the image forming apparatus 1303 in the above-described environment will be described below.

The Active Directory Server 1304 transmits the group policy to the image forming apparatus 1303 after the image forming apparatus 1303 has logged into the Active Directory environment. However, if the image forming apparatus 1303 does not include a group policy control function, and the function of transmitting the certificate information therein is disabled, the image forming apparatus 1303 does not transmit the certificate information to the Active Directory Server 1304. If the Active Directory Server 1304 does not receive from the image forming apparatus 1303 the certificate information after a predetermined time has elapsed from transmitting the group policy, the Active Directory Server 1304 determines that the certificate transmission setting of the image forming apparatus 1303 is disabled.

In such a case, the Active Directory Server 1304 transmits to the image forming apparatus 1303 a command to change the setting value of the certificate transmission setting to enabled. For example, a command for changing the corresponding setting value of a management information base (MIB) using simple network management protocol (SNMP) is transmitted. The image forming apparatus 1303 receiving the command changes the instructed setting value. The image forming apparatus 1303 then registers the certificate information in the Active Directory Server 1304, so that TLS communication with the printer server 1302 can be established.

Figure 22:
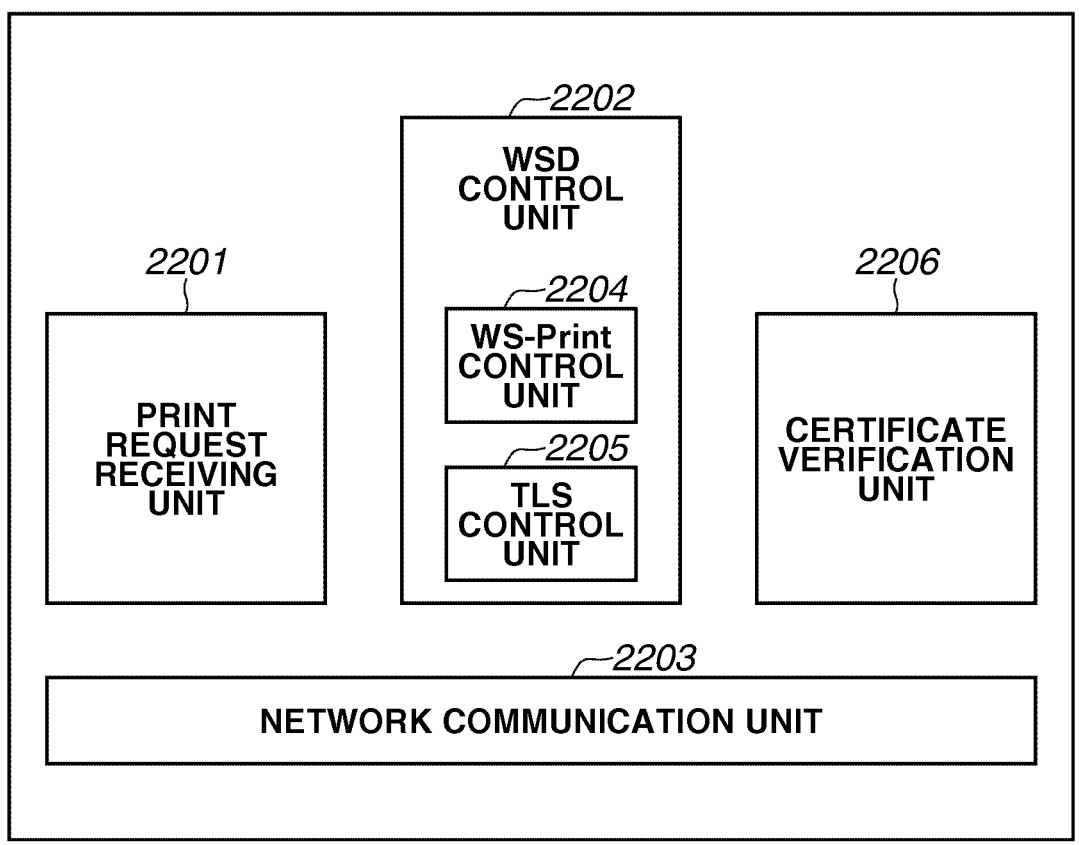
FIG. 22 is the software configuration of the printer server in the certificate verification system according to a fifth exemplary embodiment of the present invention.

FIG. 22 is a block diagram illustrating the software configuration of the printer server 103 in the certificate verification system according to the fifth exemplary embodiment. The operational specification of the printer server 103 is similar to those of the first, second, third, fourth, and fifth exemplary embodiments. Referring to FIG. 22, the printer server 103 includes a print request receiving unit 2201, a WSD control unit 2202, a certificate information verification unit 2206, and a network communication unit 2203.

The print request receiving unit 2201 receives the print request from the print client 101. The WSD control unit 2202 includes a WS-Print control unit 2204 and a TLS control unit 2205. The WS-Print control unit 2204 controls the image forming apparatus designated by the user to perform printing using WSD. The TLS control unit 2205 performs, when the TLS setting is enabled, TLS-WSD communication using the certificate. The certificate information verification unit 2206 extracts the certificate information from the certificate received from the image forming apparatus 105, and performs the process for verifying the validity of the certificate information with respect to the authentication server 104. The network communication unit 2203 is a network protocol stack, and control transmission and reception of the network data between the external terminals.

Figure 23:
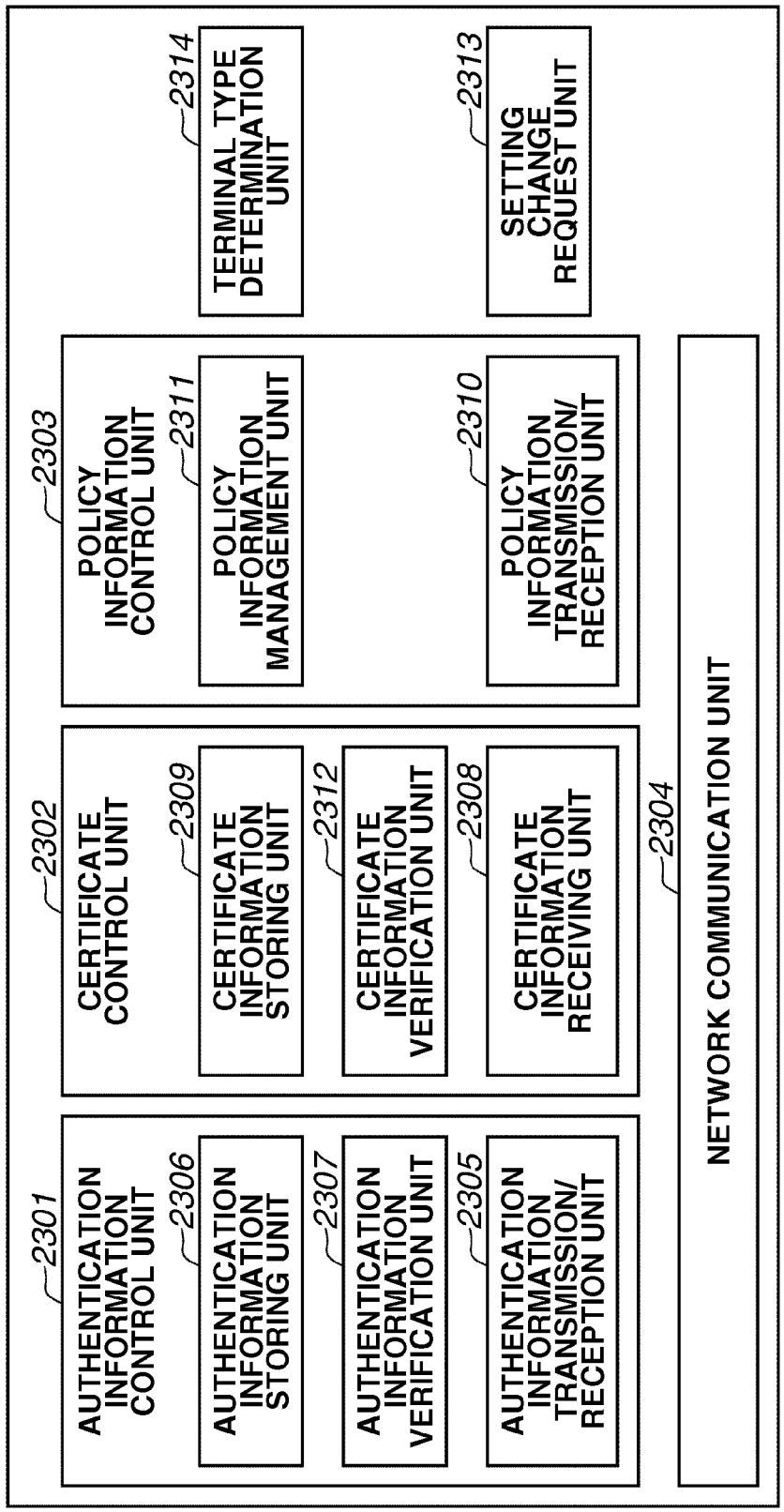
FIG. 23 is the software configuration of the authentication server according to the fifth exemplary embodiment.

FIG. 23 is a block diagram illustrating the software configuration of the Active Directory Server 1304 according to the fifth exemplary embodiment. Referring to FIG. 23, the processing units having reference numerals 2301, 2302, 2303, 2304, 2305, 2306, 2307, 2308, 2309, 2310, 2311, and 2312 perform operations similar to those of the corresponding processing units having reference numerals 1201, 1202, 1203, 1204, 1205, 1206, 1207, 1208, 1209, 1210, 1211, and 1212 illustrated in FIG. 12. A setting change request unit 2313 transmits a request to the terminal connected to the network to change a specific setting value. A terminal type determination unit 2314 determines whether the terminal connected to the Active Directory Server 1304 is a print client, an image forming apparatus, or a printer server.

According to the above-described exemplary embodiments, the WSD is described as an example. However, since the present invention is applicable to any communication protocol using TLS, this is not a limitation. For example, the present invention is applicable to the Internet Printing Protocol (IPP) or the Hypertext Transfer Protocol (HTTP) for performing direct printing. Further, the present invention is applicable to search protocols such as Bonjour and Universal Plug and Play (UPnP).

According to the exemplary embodiments of the present invention, the Active Directory Server 1304 notifies of the group policy information. However, the image forming apparatus 1303 may also acquire the group policy information. For example, the image forming apparatus 1303 may use a lightweight directory access protocol (LDAP) and search for the group policy information of the Active Directory Server 1304. The image forming apparatus 1303 may then acquire the information using Server Message Block (SMB).

According to the exemplary embodiments of the present invention, TLS is described as an example. However, since the present invention is applicable to any communication protocol using the certificate, this is not a limitation. For example, the present invention is applicable to Internet Protocol Security (IPSec) and Secure Socket Layer (SSL).

The present invention is effective only in the case where the image forming apparatus is logged into the Active Directory environment. When the image forming apparatus 1303 has logged out from the Active Directory environment, it is not necessary to perform the operations according to the specification of the present invention, so that the image forming apparatus 1303 operates according to the default settings.

According to the exemplary embodiments of the present invention, the printer server 1302 transmits the certificate information to the Active Directory Server 1304, and the Active Directory Server 1304 verifies the validity of the certificate information. However, the printer server 1302 may refer to or acquire a certificate information list in the Active Directory Server 1304, and verify the validity of the certificate information.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-190687 filed Sep. 1, 2011, which is hereby incorporated by reference herein in its entirety.

What is claimed is:

1. An apparatus for use in a printing system that includes a print client including a transmission unit configured to transmit a print request to a printer server, the printer server including a receiving unit configured to receive the print request, a print request transmission unit configured to transmit, using a secure print protocol employing a certificate having certificate information including attribute information, the received print request to the apparatus, and an inquiry unit configured to inquire of an authentication server about validity of the certificate, and the authentication server including a verification unit configured to verify, based on the certificate that has been registered, whether the certificate is valid, the apparatus comprising:

a policy receiving unit configured to transmit authentication information to the authentication server, and to receive policy information transmitted in response to authentication performed based on the authentication information;

an enabling unit configured to enable a secure print setting according to a specification in the received policy information indicating that printing is to be performed using the secure print protocol; and a control unit configured to control, in response to the secure print setting becoming enabled, performing printing in a case where the print request is transmitted using the secure print protocol and the authentication server has verified that the certificate is valid after being notified by the policy receiving unit of the policy information, where a number of attribute information increases, a data size of the certificate information increases, and wherein the policy receiving unit, the enabling unit, and the control unit are implemented by a hardware processor and a memory.

2. The apparatus according to claim 1, wherein the policy information includes information indicating whether the printing system is to be an environment that performs printing using the secure print protocol, and/or information indicating whether to register the certificate in the authentication server.

3. The apparatus according to claim 1, further comprising a generation unit configured to generate, in a case where a certificate is not stored when registering the certificate in the authentication server before performing printing using the secure print protocol, a self-signed certificate, wherein the generation unit is implemented by the processor and the memory.

4. An apparatus for use in a printing system that includes a print client including a transmission unit configured to transmit a print request to a printer server, the printer server including a receiving unit configured to receive the print request, a print request transmission unit configured to transmit, using a secure print protocol employing a certificate having certificate information including attribute information, the received print request to the apparatus, and an inquiry unit configured to inquire of an authentication server about validity of the certificate transmitted from the apparatus, and the authentication server including a verification unit configured to verify, based on the certificate of the apparatus that has been registered, whether the certificate transmitted according to an inquiry from the printer server is valid, the apparatus comprising:

a setting unit configured to, when both a secure print setting for performing printing using the secure print protocol employing the certificate and a normal print setting for performing printing using a print protocol employing plain text are enabled, and the printer server has transmitted, using the secure print control employing the certificate, the received print request to the apparatus, disable the normal print setting for performing printing using the print protocol employing plain text; and a control unit configured to control, after the normal print setting has been disabled, performing printing when a print request is transmitted using the secure print protocol employing the certificate and the authentication server has verified that the certificate is valid after being notified by the policy receiving unit of the policy information, where a number of attribute information increases, a data size of the certificate information increases, and wherein the setting unit and the control unit are implemented by a hardware processor and a memory.

5. The apparatus according to claim 4, wherein the policy information includes information indicating whether the printing system is to be an environment that performs printing using the secure print protocol, and/or information indicating whether to register the certificate in the authentication server.

6. The apparatus according to claim 4, further comprising a generation unit configured to generate, in a case where a certificate is not stored when registering the certificate in the authentication server before performing printing using the secure print protocol, a self-signed certificate, wherein the generation unit is implemented by the processor and the memory.

7. A method for controlling an apparatus for use in a printing system that includes a print client including a transmission unit configured to transmit a print request to a printer server, a printer server including a receiving unit configured to receive the print request transmitted from the print client, a print request transmission unit configured to transmit, using a secure print protocol employing a certificate having certificate information including attribute information, the received print request to the apparatus, and an inquiry unit configured to inquire of an authentication server about validity of the certificate transmitted from the apparatus, and an authentication server including a verification unit configured to verify, based on the certificate of the apparatus that has been registered, whether a certificate transmitted according to an inquiry from the printer server is valid, the method comprising:

transmitting authentication information to the authentication server, and receiving policy information transmitted in response to authentication performed based on the authentication information by a policy receiving unit;

enabling a secure print setting according to a specification in the received policy information indicating that printing is to be performed using a secure print protocol employing the certificate; and controlling, in response to the secure print setting becoming enabled, to perform printing in a case where the print request is transmitted using the secure print protocol employing the certificate and the authentication server has verified that the certificate is valid after being notified by the policy receiving unit of the policy information, where a number of attribute information increases, a data size of the certificate information increases.

8. The method according to claim 7, wherein the policy information includes information indicating whether the printing system is to be an environment that performs printing using the secure print protocol, and/or information indicating whether to register the certificate in the authentication server.

9. The method according to claim 7, further comprising generating, in a case where the certificate is not stored when registering the certificate in the authentication server before performing printing using the secure print protocol, a self-signed certificate.

* * * * *